US007933892B2

(12) United States Patent
Kanemasa

(10) Patent No.: US 7,933,892 B2
(45) Date of Patent: Apr. 26, 2011

(54) COMPUTER-READABLE MEDIUM STORING PROGRAM FOR AUTOMATICALLY GENERATING QUERY WINDOW, APPARATUS FOR AUTOMATICALLY GENERATING QUERY WINDOW, AND METHOD FOR AUTOMATICALLY GENERATING QUERY WINDOW

(75) Inventor: Yasuhiko Kanemasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 12/058,163

(22) Filed: Mar. 28, 2008

(65) Prior Publication Data
US 2009/0043746 A1 Feb. 12, 2009

(30) Foreign Application Priority Data

Aug. 8, 2007 (JP) ................................. 2007-207274

(51) Int. Cl.
*G06F 17/30* (2006.01)
(52) U.S. Cl. ........................................................ 707/713
(58) Field of Classification Search .................. 707/713, 707/722, 758, 772, 773, 775, E17.058, E17.122
See application file for complete search history.

(56) References Cited

U.S. PATENT DOCUMENTS
2006/0248092 A1* 11/2006 Keller et al. ................... 707/100

FOREIGN PATENT DOCUMENTS
| JP | 2005-208757 | 8/2005 |
| JP | 2006-018607 | 1/2006 |
| JP | 2007-257083 | 10/2007 |

* cited by examiner

*Primary Examiner* — Fred I Ehichioya
(74) *Attorney, Agent, or Firm* — Staas & Halsey LLP

(57) ABSTRACT

A query processing apparatus and method automatically generating a query window for an end user. The apparatus and method includes acquiring virtual schema information about tagged document data, automatically generating a query window on the basis of the virtual schema information, specifying an increase or a decrease in a number of repetitions of condition input fields for a repetitive item on the query window, copying content of the condition input fields in a certain repetition to the condition input fields in a newly-added repetition when an increase in the number of repetitions is specified, specifying a joining condition between conditions in each of the repetitions; and generating query code from information input in the query window and transmitting the query code to the query processing apparatus.

6 Claims, 24 Drawing Sheets

FIG. 4

```
<?xml version="1.0" encoding="EUC-JP" ?>
<xs:schema targetNamespace="http://labs.fujitsu.com/schema/oreder-list.xsd"
 xmlns:xs="http://www.w3.org/2001/XMLSchema"
 xmlns:ol="http://labs.fujitsu.com/schema/oreder-list.xsd">

<xs:element name="Order list" type="ol:OrderListType"/>                         } 404

<!-- Type definition of "Order list" -->
    <xs:complexType name="OrderListType">
        <xs:sequence>
            <xs:element name="Order " type="ol:OrderType" maxOccurs="unbounded" />  } 401-1
        </xs:sequence>
    </xs:complexType>

<!-- Type definition of "Order" -->
    <xs:complexType name="OrderType">
        <xs:sequence>
            <xs:element name="Order number" type="xs:string" />       ⎫
            <xs:element name="Orderer " type="xs:string" />           ⎬ 403-1
            <xs:element name="Receiver" type="xs:string" />           ⎪
            <xs:element name=" Date " type="xs:date" />               ⎭
            <xs:element name=" Article list " type="ol:ItemListType" maxOccurs="1" /> } 402-1
        </xs:sequence>
    </xs:complexType>

<!-- Type definition of "Article list" -->
    <xs:complexType name="ItemListType">
        <xs:sequence>
            <xs:element name="Article" type="ol:ItemType" maxOccurs="20" />         } 401-2
        </xs:sequence>
    </xs:complexType>

<!-- Type definition of "Article" -->
    <xs:complexType name="ItemType">
        <xs:sequence>
            <xs:element name=" Code " type="xs:string" />      ⎫
            <xs:element name="Article name " type="xs:string" />⎬ 403-2
            <xs:element name="Quantity" type="xs:unsignedInt" />⎭
        </xs:sequence>
    </xs:complexType>

</xs:schema>
```

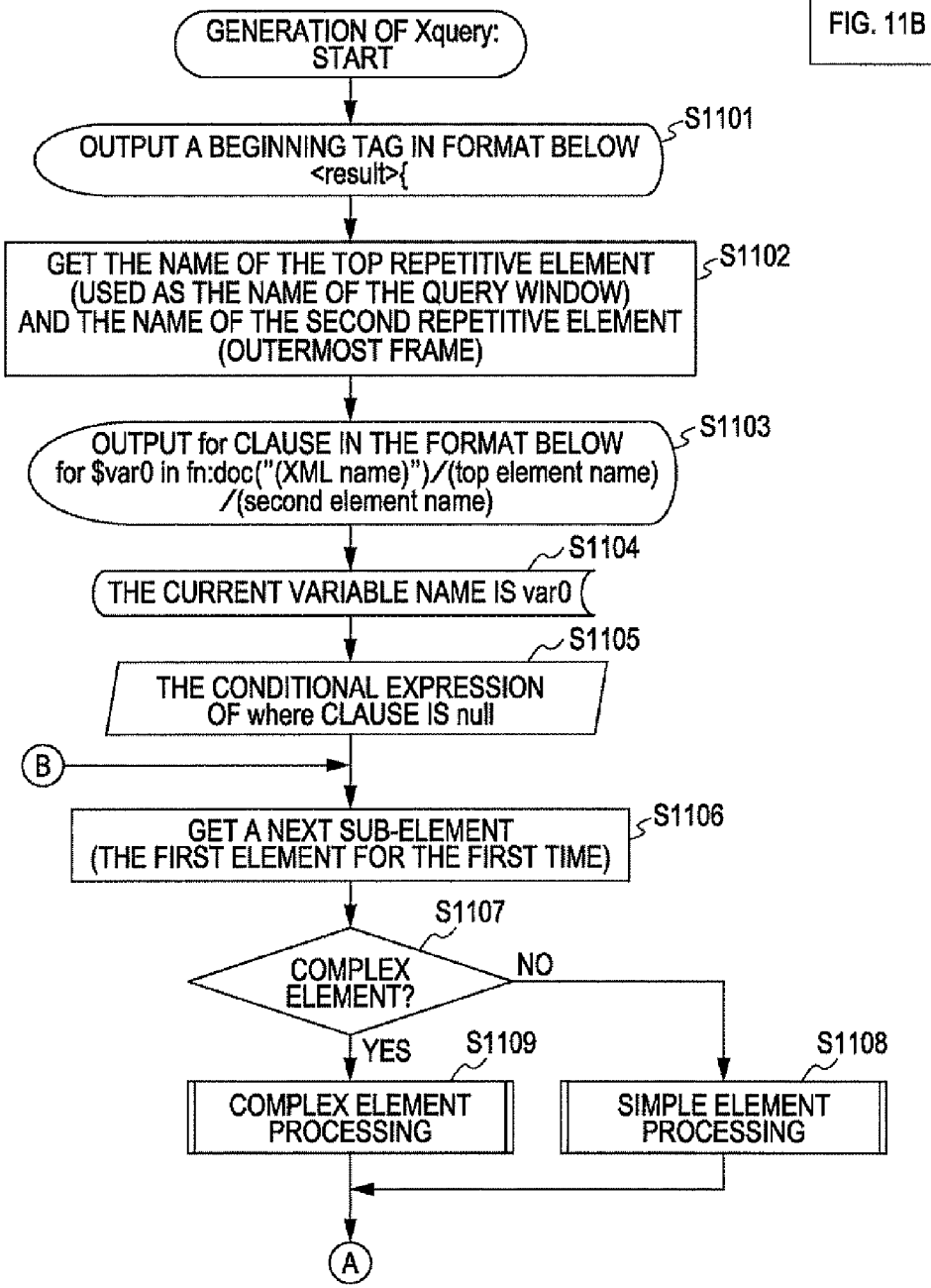

FIG. 15

```
<result>{ for $var0 in fn:doc("order-list.xml")/Order_list/Order let $var1 := $var0/Article_list let $var2 := $var1/Article let $var3 := $var1/Article let $var4 := $var1/Article where ($var0/Order_number="20050406-001"

or   $var0/Order_number="20050406-002")

and (($var2/Article_name="FMV W5240")

and   $var2/Quantity>=2)

or   ($var3/Article_name="FMV W630"

and   $var3/Quantity<5)

or    $var4/Code="FMVLT70M")

return $var0

}</result>
```

FIG. 18

```
<?xml version="1.0" encoding="EUC-JP" ?>
<vx:virtual_xml xmlns:vx="../schema/virtual_xml.xsd">
    <MetaVersion>3.0</MetaVersion>
    <Owner>group1</Owner>

<!-- VIRTUAL XML SCHEMA INFORMATION -->
    <VirtualXmlSchema name="order-list.xml">
        <complexElement name="order" visible="true" maxOccurs="1000">       ⎫ REPETITIVE
            <complexElementID>1</complexElementID>                           ⎬ COMPLEX
            <simpleElement name="order_id" visible="true">                   ⎭ ELEMENT
                <simpleElementID>1</simpleElementID>
            </simpleElement>
            <simpleElement name="purchaser" visible="true">                  ⎫ SIMPLE ELEMENT
                <simpleElementID>2</simpleElementID>
            </simpleElement>                                                 ⎫ NON-REPETITIVE
            <simpleElement name="order_date" visible="true">                 ⎬ COMPLEX
                <simpleElementID>4</simpleElementID>                         ⎭ ELEMENT
            </simpleElement>
            <tagElement name="items">
                <complexElement name="item" visible="true" maxOccurs="10">   ⎫ REPETITIVE
                    <complexElementID>2</complexElementID>                   ⎬ COMPLEX
                    <simpleElement name="order_id2" visible="false">         ⎭ ELEMENT
                        <simpleElementID>5</simpleElementID>
                    </simpleElement>
                    <simpleElement name="code" visible="true">               ⎫ SIMPLE ELEMENT
                        <simpleElementID>6</simpleElementID>
                    </simpleElement>
                    <complexElement name="item" visible="false" maxOccurs="1">
                        <complexElementID>3</complexElementID>
                        <simpleElement name="code" visible="false">
                            <simpleElementID>8</simpleElementID>
                        </simpleElement>
                        <simpleElement name="name" visible="true">           ⎫ SIMPLE ELEMENT
                            <simpleElementID>9</simpleElementID>
                        </simpleElement>
                    </complexElement>
                    <simpleElement name="quantity" visible="true">           ⎫ SIMPLE ELEMENT
                        <simpleElementID>7</simpleElementID>
                    </simpleElement>
                    <complexElement name="item_stock" visible="false" maxOccurs="1">
                        <complexElementID>4</complexElementID>
                        <simpleElement name="item_code" visible="false">
                            <simpleElementID>10</simpleElementID>
                        </simpleElement>
                        <simpleElement name="stock_quantity" visible="true"> ⎫ SIMPLE ELEMENT
                            <simpleElementID>11</simpleElementID>
                        </simpleElement>
                    </complexElement>
                </complexElement>
            </tagElement>
        </complexElement>
    </VirtualXmlSchema>
```

FIG. 19

```xml
<!-- CORRESPONDENCE WITH DATABASE ITEMS -->
<DBInfo>

<!-- ACCEPTANCE DB -->
    <RdbRecord>
            <id>1</id>
            <RdbDatabase>
                    <databaseID>0</databaseID>
                    <tableID>0</tableID>
                    <column>
                            <simpleElementID>1</simpleElementID>
                            <columnID>0</columnID>
                    </column>
                    <column>
                            <simpleElementID>2</simpleElementID>
                            <columnID>1</columnID>
                    </column>
                    <column>
                            <simpleElementID>4</simpleElementID>
                            <columnID>3</columnID>
                    </column>
            </RdbDatabase>
    </RdbRecord>
    <RdbRecord>
            <id>2</id>
            <RdbDatabase>
                    <databaseID>0</databaseID>
                    <tableID>1</tableID>
                    <column>
                            <simpleElementID>5</simpleElementID>
                            <columnID>0</columnID>
                    </column>
                    <column>
                            <simpleElementID>6</simpleElementID>
                            <columnID>1</columnID>
                    </column>
                    <column>
                            <simpleElementID>7</simpleElementID>
                            <columnID>2</columnID>
                    </column>
            </RdbDatabase>
    </RdbRecord>
```

FIG. 20

```xml
<!-- ARTICLE DB -->
<RdbRecord>
    <complexElementID>3</complexElementID>
    <RdbDatabase>
        <databaseID>1</databaseID>
        <tableID>0</tableID>
        <column>
            <simpleElementID>8</simpleElementID>
            <columnID>0</columnID>
        </column>
        <column>
            <simpleElementID>9</simpleElementID>
            <columnID>1</columnID>
        </column>
    </RdbDatabase>
</RdbRecord>

<!-- STOCK DB1 AND STOCK DB2 -->
<RdbRecord>
    <complexElementID>4</complexElementID>
    <RdbDatabase>
        <databaseID>2</databaseID>
        <tableID>0</tableID>
        <column>
            <simpleElementID>10</simpleElementID>
            <columnID>0</columnID>
        </column>
        <column>
            <simpleElementID>11</simpleElementID>
            <columnID>1</columnID>
        </column>
    </RdbDatabase>
    <RdbDatabase>
        <databaseID>3</databaseID>
        <tableID>0</tableID>
        <column>
            <simpleElementID>10</simpleElementID>
            <columnID>0</columnID>
        </column>
        <column>
            <simpleElementID>11</simpleElementID>
            <columnID>1</columnID>
        </column>
    </RdbDatabase>
</RdbRecord>
</DBInfo>
```

FIG. 21

```xml
<!-- INFORMATION ABOUT ASSOCIATION BETWEEN ELEMENTS -->
<ElementRelationInfo>

<!-- ASSOCIATION BETWEEN ORDER FORM TABLE OF ACCEPTANCE DB AND ARTICLE TABLE -->
    <ElementRelation>
        <relation>exactmatch</relation>
        <relement>
            <complexElementID>1</complexElementID>
            <simpleElementID>1</simpleElementID>
        </relement>
        <relement>
            <complexElementID>2</complexElementID>
            <simpleElementID>5</simpleElementID>
        </relement>
    </ElementRelation>

<!-- ASSOCIATION BETWEEN ACCEPTANCE DB AND ARTICLE DB -->
    <ElementRelation>
        <relation>exactmatch</relation>
        <relement>
            <complexElementID>2</complexElementID>
            <simpleElementID>6</simpleElementID>
        </relement>
        <relement>
            <complexElementID>3</complexElementID>
            <simpleElementID>8</simpleElementID>
        </relement>
    </ElementRelation>

<!-- ASSOCIATION BETWEEN ACCEPTANCE DB AND STOCK DB1 AND STOCK DB2 -->
    <ElementRelation>
        <relation>exactmatch</relation>
        <relement>
            <complexElementID>2</complexElementID>
            <simpleElementID>6</simpleElementID>
        </relement>
        <relement>
            <complexElementID>4</complexElementID>
            <simpleElementID>10</simpleElementID>
        </relement>
    </ElementRelation>

</ElementRelationInfo>
</vx:virtual_xml>
``` ion US 7,933,892 B2

COMPUTER-READABLE MEDIUM STORING PROGRAM FOR AUTOMATICALLY GENERATING QUERY WINDOW, APPARATUS FOR AUTOMATICALLY GENERATING QUERY WINDOW, AND METHOD FOR AUTOMATICALLY GENERATING QUERY WINDOW

CROSS-REFERENCE TO RELATED APPLICATIONS

This application is related to and claims priority to Japanese patent application no. 2007-207274 filed on Aug. 8, 2007, in the Japan Patent Office, and incorporated by reference herein.

BACKGROUND

Field

The present invention typically relates to a technology allowing an end user having no technical knowledge about query languages to easily make or formulate a query in a system that receives a query in a query language (for example, XQuery) about data in a tagged document format such as Extensible Markup Language (XML), processes the query, and returns a corresponding tagged document.

SUMMARY

An apparatus and method automatically generating a query window for an end user. The query processing apparatus includes an interface that virtually integrates and processes data distributed and stored in multiple databases in response to a query in a query language related to data in a tagged document format to return tagged document data and returns virtual schema information describing a relationship between the tagged document data and the multiple databases.

The disclosed apparatus and method includes acquiring virtual schema information related to tagged document data from the query processing apparatus, automatically generating a query window based on the acquired virtual schema information, specifying an increase or a decrease in a number of repetitions of condition input fields for a repetitive item on the query window that is automatically generated, copying content of the condition input fields in a certain repetition to the condition input fields in a repetition to be newly added when an increase in the number of repetitions is specified, specifying a joining condition between conditions corresponding to the condition input fields in each of the repetitions, an increase or a decrease in the number of which is specified, and generating query code from information input in the query window and transmitting the query code to the query processing apparatus.

Additional aspects and/or advantages will be set forth in part in the description which follows and, in part, will be apparent from the description, or may be learned by practice of the invention.

Further features of the present invention will become apparent from the following description of exemplary embodiments with reference to the attached drawings.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates an example of schema information in XML Schema;
FIGS. 11A and 11B are flowcharts illustrating an example of operation(s) for generating XQuery code;
FIG. 15 illustrates an example of XQuery code that is generated;
FIG. 18 illustrates an example (virtual XML schema information) of database integration metadata;
FIG. 19 illustrates an example (a correspondence with database item(s)) of a database integration metadata;
FIG. 20 illustrates an example (a correspondence with database item(s)) of a database integration metadata;
and
FIG. 21 illustrates an example (information about association between element(s)) of a database integration metadata.

DETAILED DESCRIPTION OF THE EMBODIMENTS

Figure 1:
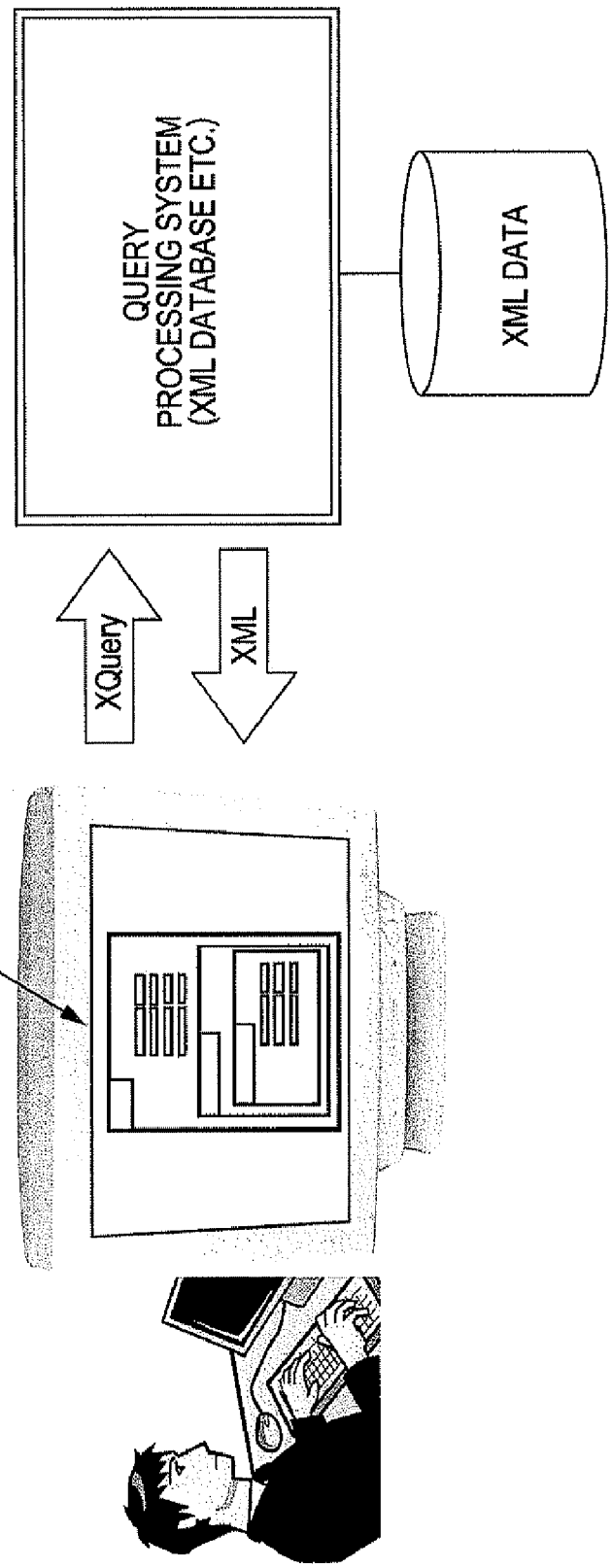
FIG. 1 illustrates a configuration of a related art.

Reference will now be made in detail to the embodiments, examples of which are illustrated in the accompanying drawings, wherein like reference numerals refer to the like elements throughout. The embodiments are described below to explain the present invention by referring to the figures.

The present invention is provided to resolve the following and other existing problems.

Systems (such as XML databases, etc) which store data in tagged document formats, such as the XML, and which have query processing functions use query languages, such as the Xquery language, as access interfaces to data. Some systems use the tagged document formats, such as the XML, and the query languages supporting the tagged document formats as the query interfaces although the systems store data in other formats (for example, data of relational tables) as the entities.

However, since such systems require end users to have technical knowledge about query language(s) in order to make or formulate the queries, it is difficult for the end users to directly make the queries. Accordingly, in a typical system, a specialist of system building (system engineer: SE), etc., creates each query window by programming and end users use the query window to make queries, as shown in FIG. 1.

In the related art described above, the end users can make the queries about data for which the query windows are prepared only by specifying conditions, provided on the query windows. In order for end users to make the queries about new data or to make the queries by new condition specification methods that are not provided on the existing query windows, the end users request specialists of system building to generate query windows and wait for completion of the query windows. In such cases, it takes time before the queries can be formulated and cost is generally associated with generating the windows. Accordingly, it is difficult for the end users to freely make the queries.

In addition, if the content of data is updated after generating the query windows, it is necessary to disadvantageously modify the query windows in accordance with the update of the data. The modification of the query windows is required even if one item (i.e. item name) is updated. Although such problems are hardly caused in systems, such as the XML databases, holding the entities of data, systems that do not hold the entities of data and that adopt the XML as data exchange interfaces are likely to face such problems.

Although there are technologies developed for generating query code in query languages (for example, the Xquery) by using graphical user interface (GUI) windows, many of these and similar technologies are for system developers. Since it is not easy even for the system developers to describe the complex XQuery code across multiple XMLs, the XQuery code are generated by using the GUI windows. The present invention provides a technology for automatically generating a query window, which an end user can easily use and which is fundamentally different from the technologies in the related art.

It is an object of the present invention to provide a technology for automatically generating a query window with which an end user including one having no technical knowledge about query languages can easily make or formulate a query in a system that receives a query in a query language related to data in a tagged document format such as the XML, processes the query, and return a corresponding tagged document.

A computer-readable medium storing a program for automatically generating a query window, an apparatus and method for automatically generating a query window, according to embodiments of the present invention, will herein be described with reference to the attached drawings.

An aspect of the present invention is embodied by a computer program, an apparatus, or a method having the configuration described below.

A query processing unit virtually integrates and processes data distributed and stored in multiple databases in response to a query in a query language about or related to data in a tagged document format, such as the XML, to return tagged document data and returns virtual schema information describing a relationship between the tagged document data and the multiple databases.

In a configuration according to an embodiment of the present invention, a virtual schema information acquiring operation includes acquiring virtual schema information about or related to tagged document data from a query processing unit.

An automatic query window generation operation unit automatically generates a query window on the basis of the acquired virtual schema information.

An increase-or-decrease-of-repetition specifying operation specifies an increase or a decrease in a number of repetition(s) of condition input field(s) for a repetitive item on a query window that is automatically generated by the automatic query window generation unit.

A condition-input-field-in-repetition copying operation includes copying content of the condition input fields in a certain repetition to the condition input fields in a repetition to be newly added in response to the increase-or-decrease-of-repetition specifying operation specifying the increase in the number of repetitions.

A joining-operator-in-repetition specifying operation specifies a joining condition between conditions corresponding to the condition input fields in each of the repetitions, an increase or decrease in the number of which is specified by the increase-or-decrease-of-repetition specifying operation.

A query code generating operation generates query code from information input in the query window and transmits the query code to the query processing unit.

In the configuration according to an embodiment of the present invention, the automatic query window generating may include switching choice(s) for an operator in an condition input field corresponding to each item having a value on a query window, depending on a data type of the item.

The configuration according to an embodiment of the present invention may include operation(s) of specifying an increase or a decrease in a number of condition input field(s) corresponding to item(s) each having a value on the query window that is automatically generated by the automatic query window generating unit and specifying a joining condition between conditions corresponding to the condition input fields, an increase or a decrease in the number of which is specified.

The configuration according to an embodiment of the present invention may include the operations of holding customization information used for customizing content displayed in a query window and varying the content displayed in the query window on the basis of the customization information.

An embodiment of the present invention has the following configuration.

A query processing unit includes an interface that processes a query in a query language about or related to data in a tagged document format, such as the XML, to return tagged document data and that returns schema information about the tagged document data that is stored.

A schema information acquiring part acquires schema information about tagged document data from the query processing unit.

An automatic query window generation unit automatically generates a query window on the basis of a structure of the acquired schema information.

A query code generating part generates query code from information input in the query window and transmits the query code to the query processing unit.

The configuration according to an embodiment of the present invention may include holding customization information used for customizing content displayed in the query window and varying content displayed in the query window generated by the automatic query window generation part on the basis of the customization information.

Figure 2:
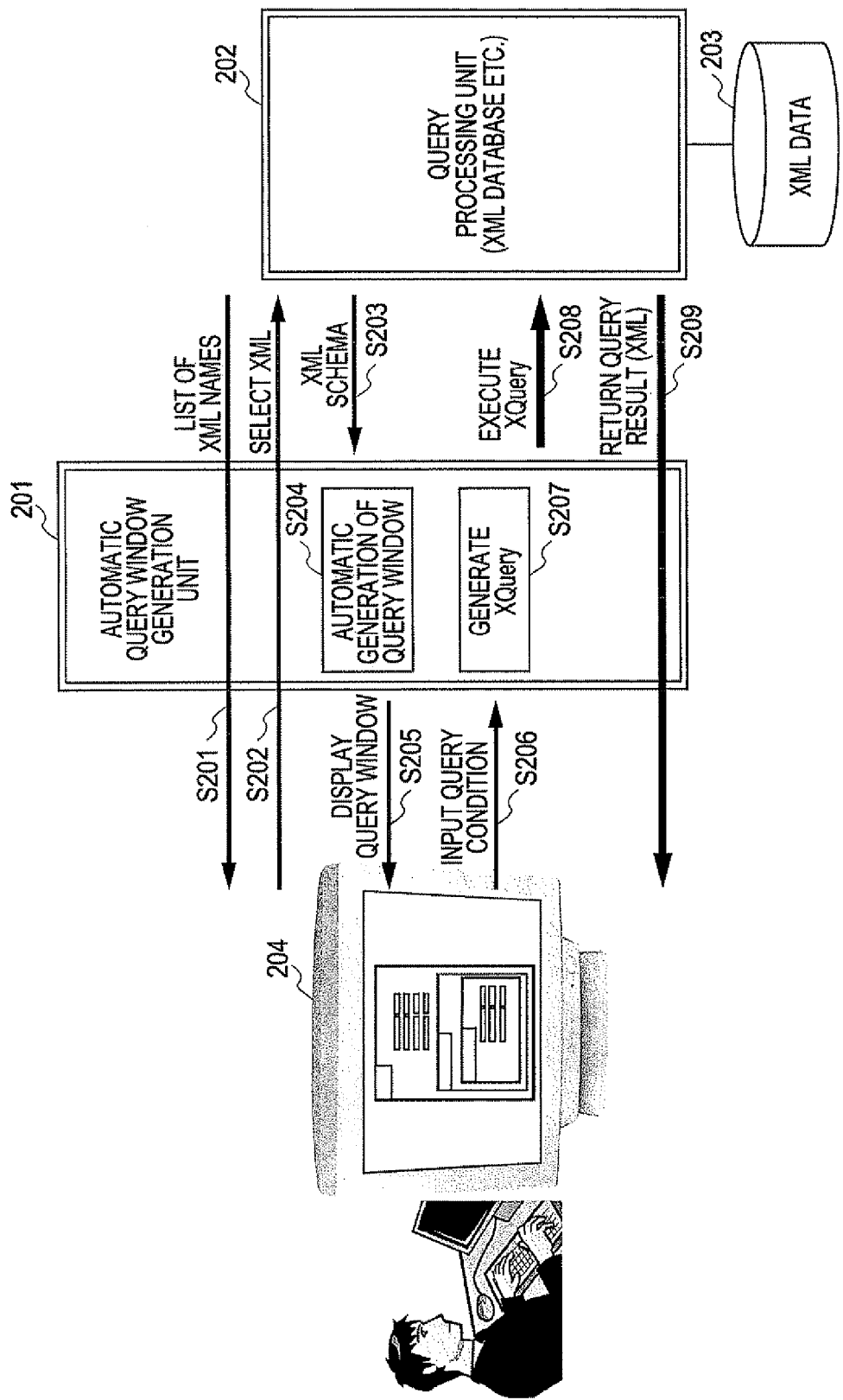
FIG. 2 illustrates a configuration and a query process

FIG. 2 illustrates a configuration and a query process according to an embodiment of the present invention.

In the query process according to an embodiment of the present invention, in order to resolve the above-described and other problems of the related art, an automatic query window generation unit 201 automatically generates a query window for end user(s), which is displayed in a display apparatus 204, on the basis of schema information acquired from a query processing unit 202.

In the query process in FIG. 2, in operation S201, the automatic query window generation unit 201 acquires a list of data in a tagged document format (hereinafter referred to as tagged document data) such as XML name(s) from the query processing unit 202.

In operation S202, the automatic query window generation unit 201 displays the acquired list on a screen for end users of the display apparatus 204 and an end user selects tagged document data (such as XML) about which the end user wants to make a query from the list.

In operation S203, the automatic query window generation unit 201 acquires schema information such as XML schema information about the tagged document data selected by the end user from the query processing unit 202. In operation S204, the automatic query window generation unit 201 automatically generates a query window on the basis of the schema information.

According to the embodiments of the present invention, the XML is a as an exemplary tagged document format. Instead of the XML, another tagged document format, such as Standard Generalized Markup Language (SGML), may be adopted. The XQuery defined by World Wide Web Consortium (W3C) is adopted as the query language used in the query window to be generated. The XQuery is the query language supported in the XML. XML Schema also defined by the W3C is adopted as the schema information.

Figure 3:
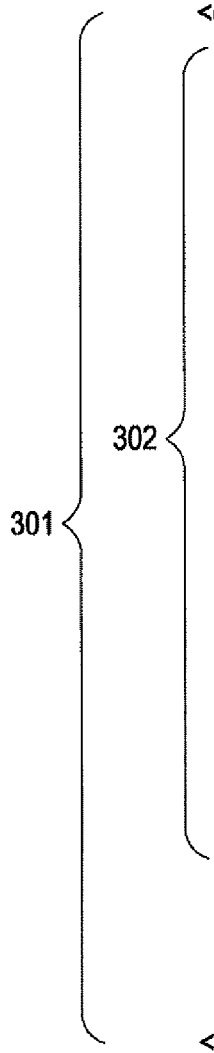
FIG. 3 illustrates an example of XML data.

In the XML data according to an embodiment of the present invention, multiple elements of one kind are repeated under a top element of the XML, as shown in FIG. 3. A specific repetition of such XML data is extracted by the query method according to an embodiment of the present invention. In the example shown in FIG. 3, multiple "Order" elements 302 are repeated under the top "Order list" element 301. A specific "Order" element meeting a certain condition is extracted from the XML data in the process of automatically generating a query window according to an embodiment of the present invention.

The automatic query window generation unit 201 sequentially follows a tree structure of the tagged document data from the top element to detect each element from the schema information and generates query window(s) in operation S204 in FIG. 2. In operation S205, the automatic query window generation unit 201 varies the query window displayed in the display apparatus 204 depending on which kind each element belongs to. According to an embodiment, each element belongs to either of the following two kinds:

Simple element (element having a value): no element occurs under the simple element and has a data value Complex element: at least one element occurs under the complex element In the display of the complex element, the automatic query window generation unit 201 varies the query window displayed in the display apparatus 204 depending on which kind each complex element belongs to. Each complex element belongs to either of the following two kinds:

Non-repetitive complex element: non-repetitive complex element occurs only once

Repetitive complex element: repetitive complex element occurs multiple times

Figure 5:
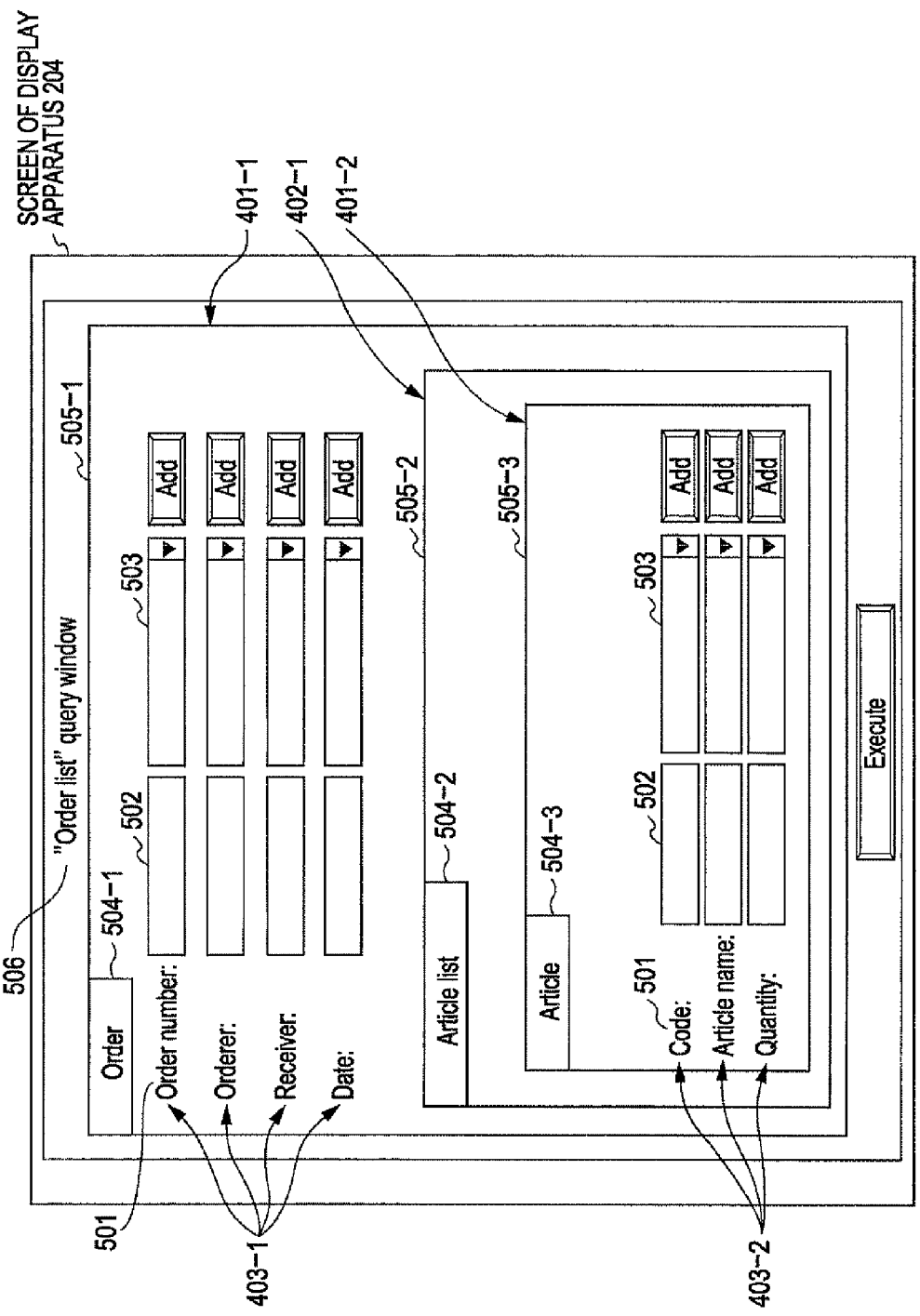
FIG. 5 illustrates an example of a query window.

FIG. 4 illustrates an example of schema information in XML data in FIG. 3. As described above, the schema information is defined in the XML Schema in embodiment(s) of the present invention. In the example shown in FIG. 4, each element is categorized according to the above-described rule as follows:

Repetitive complex elements 401-1 and 401-2: complex elements having a maxOccurs attribute whose value is equal to two or more Non-repetitive complex element 402-1: a complex element having the maxOccurs attribute whose value is equal to one Simple elements 403-1 and 403-2: simple elements In the case of simple elements, the automatic query window generation unit 201 displays element names 501 and input fields 502 and 503 where the end user specifies conditional expressions in the display apparatus 204, as shown in FIG. 5.

In the case of complex elements, the automatic query window generation unit 201 displays element names 504-1, 504-2, and 504-3 and frames 505-1, 505-2, and 505-3 surrounding the display of sub-elements under the element names 504-1, 504-2, and 504-3 in a display apparatus 204, as shown in FIG. 5.

Each input field 502 used for specifying a conditional expression is a text box where a value is input. Each input field 503 used for specifying a conditional expression is a pull-down menu from which a relational operator specifying a relationship between the value input in the input field 502 and data value held by the corresponding element is selected. In the display of the input fields, the automatic query window generation unit 201 varies choices for a relational operator specified by the end user depending on the data type of a element for which the value is input. The choices are registered in advance for each data type.

Figure 6:
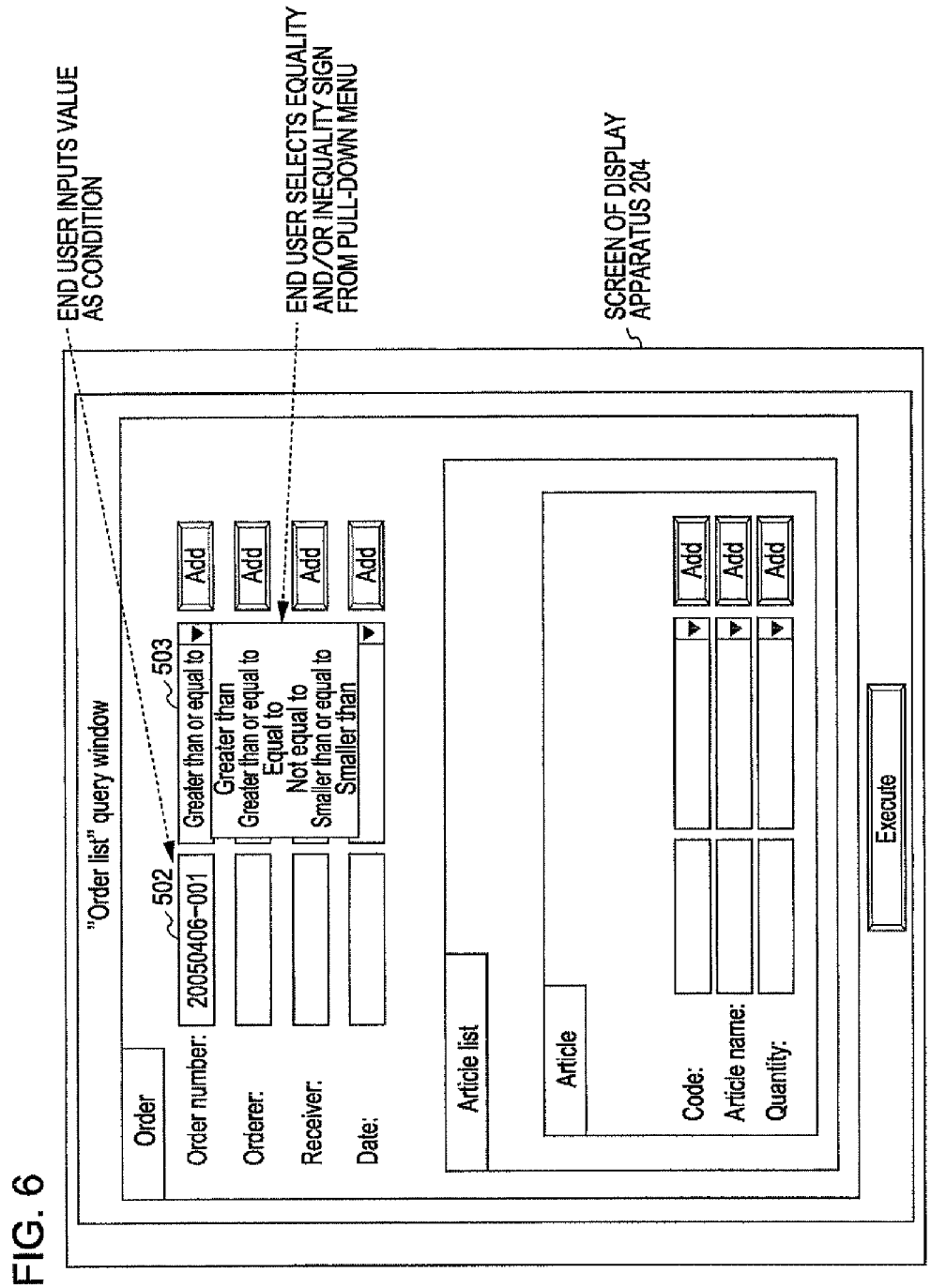
FIG. 6 illustrates an example of a query window.

For example, if the data type of an element is "int" type (integer type), the automatic query window generation unit 201 displays the following six choices, as shown by the input field 503 in FIG. 6:

equal to (=)
not equal to (!=)
greater than (>)
greater than or equal to (>=)
smaller than or equal to (<=)
smaller than (<)

If the data type of an element is "string" type (character string type), the automatic query window generation unit 201 displays the following three choices, in addition to the above six choices:

including (matching of substring)
beginning with (matching of first string)
ending with (matching of last string)

If the data type of an element is "date" type (date type), the automatic query window generation unit 201 displays the following choices:

on (=)
excluding (!=)
after (>)
on and after (>=)
on and before (<=)
before (<)

With the above configuration, the end user can select a desired query condition from the query conditions permitted only to a specified data type, thus enhancing the descriptive capability of the query. In addition, it is possible to realize clear demonstration of the choices depending on the data type.

Figure 7:
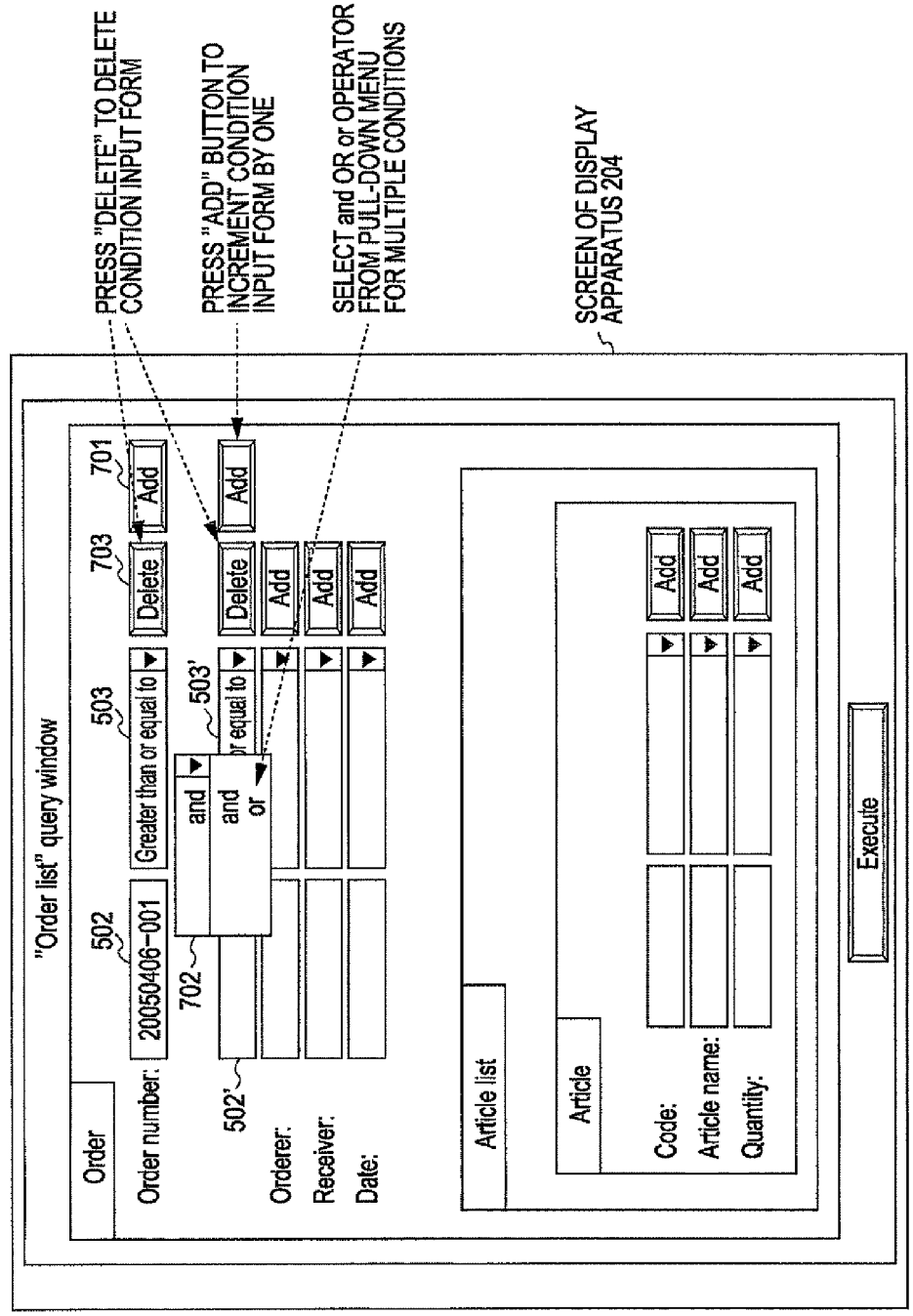
FIG. 7 illustrates an example of a query window.

In the display of the input fields, the automatic query window generation unit 201 displays an "Add" button 701 used by the end user to specify an increase in a number of input fields for the conditional expressions, as shown in FIG. 7. For example, the end user can click the "Add" button 701 with a mouse on the screen of the display apparatus 204 to increment a pair of the input field 502 and the input field 503 by one, thereby displaying input fields 502' and 503'. The automatic query window generation unit 201 also displays a pull-down menu 702 used by the end user to select a join operator ("AND" operator or "OR" operator) for joining conditions corresponding to adjacent condition input fields. The automatic query window generation unit 201 displays a "Delete"

button 703 for a pair of the input fields 502 and 503. The end user can click the "Delete" button 703 with the mouse to delete the corresponding condition input field.

With the above configuration, it is possible for the end user to make a complex query having multiple conditions for one element.

Figure 8:
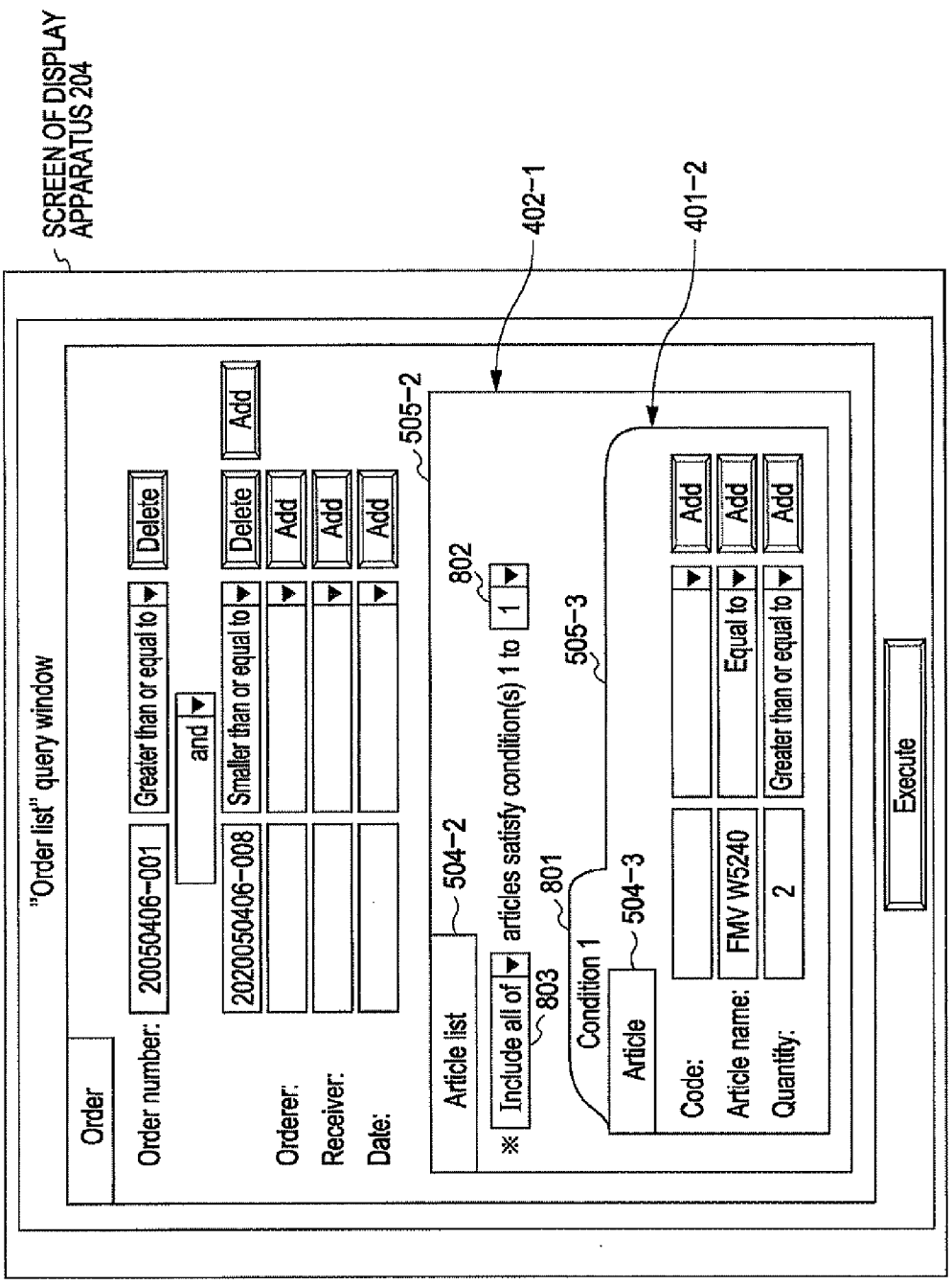
FIG. 8 illustrates an example of a query window.

When the complex element to be displayed is the non-repetitive complex element 402-1 (FIG. 4), the automatic query window generation unit 201 displays an element name 504-2 and a frame 505-2 surrounding the display of sub-elements under the element name 504-2 in the display apparatus 204, as shown in FIG. 8.

Figure 9:
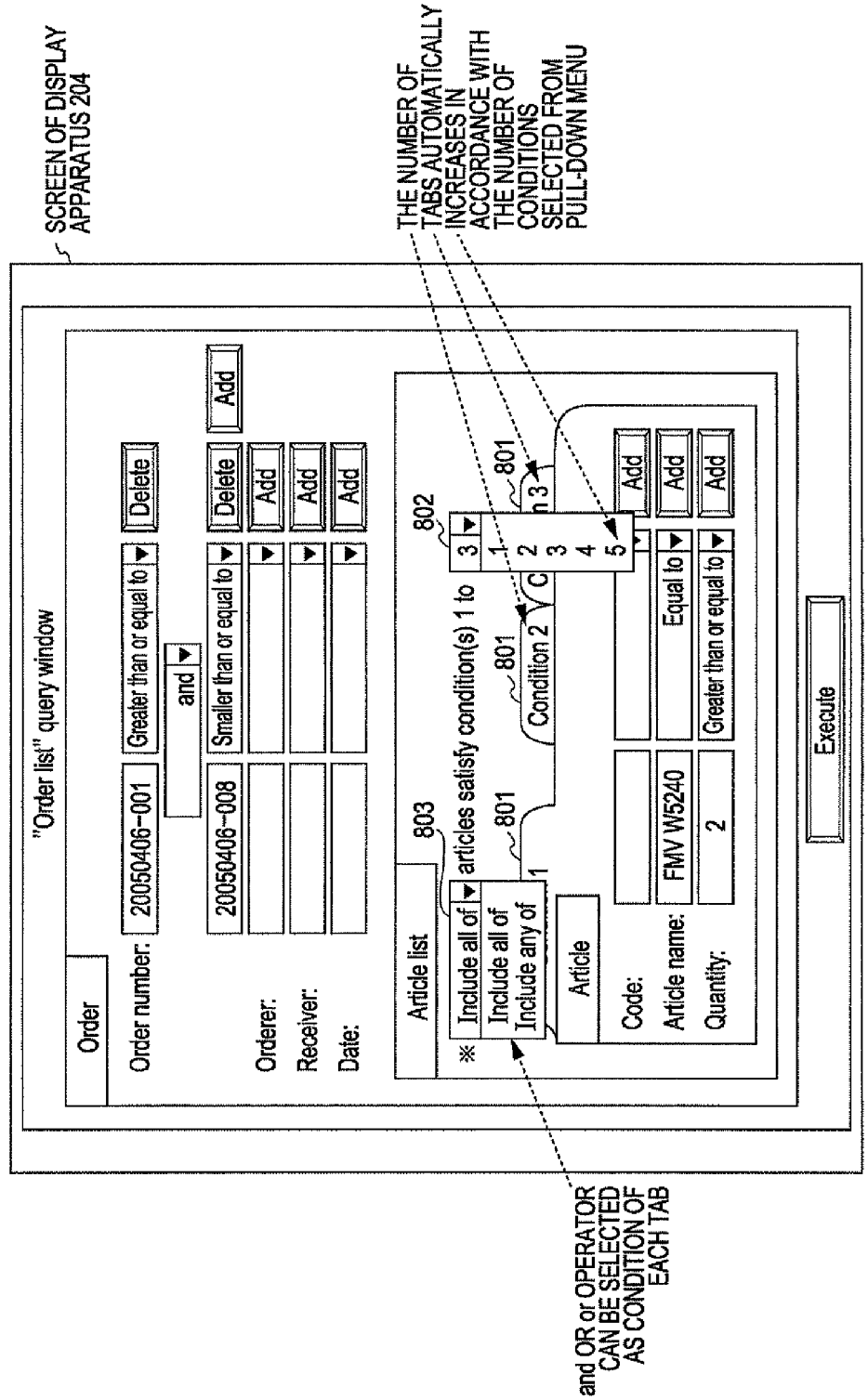
FIG. 9 illustrates an example of a query window.

When the complex element to be displayed is the repetitive complex element 401-2 (FIG. 4), the automatic query window generation unit 201 displays an element name 504-3 and a frame 505-3 surrounding a display of sub-elements under the element name 504-3 in a format of a tab 801 in the display apparatus 204, as shown in FIGS. 8 and 9.

In order to allow the end user to specify a different condition for every repetition, the automatic query window generation unit 201 displays a pull-down menu 802 used for increasing the number of the tabs 801 where the end user inputs the conditions for the repetitions in the display apparatus 204. The automatic query window generation unit 201 also displays a pull-down menu 803 used for selecting the join operator ("AND" operator or "OR" operator) between the multiple tabs 801 in the display apparatus 204.

One tab 801 is initially displayed, and the tabs 801 of the number corresponding to a number of the conditions selected from the pull-down menu 802 are subsequently displayed. The join operator between the conditions specified in the area of the tabs 801 can be selected with the pull-down menu 803. Accordingly, in the example shown in FIG. 3, it is possible to search for "an order form from XXX business company ordering three aaa articles and two bbb articles".

Although the multiple condition input fields are overlapped with each other by using the tabs 801 in consideration of clarity and the display space, any of the following display methods may be adopted.

The multiple condition input fields are surrounded by separate frames and the frames are tiled.

An input field or pull-down menu with which the condition input field to be displayed is specified is provided to display only one condition input field that is specified.

The number of the tabs may be increased or decreased by another method. Instead of the method of selecting the number of the tabs with the pull-down menu 802 shown in FIG. 9, for example, a number of the tabs may be varied by any of the following methods.

A numerical input field is provided. The end user inputs a number in the numeral input field and presses (selects) an "Execute" button to vary the number of the tabs.

An "Increment by one" button and "Decrement" buttons are provided. The number of the tabs is varied each time the end user presses (selects) either of the "Increment by one" button or the corresponding "Decrement" button. One "Increment by one" button shared between the tabs is provided outside the tabs while one "Decrement" button is provided for each tab. As an application of this method, one "Create copy of tab" button may be provided for each tab. Pressing the "Create copy of tab" button copies all the conditions input on the tab to a new tab. With this method, it is possible for the end user to rapidly input conditions, most of which match with the conditions input on an original tab and only part of which is different from them.

A required predetermined number of tabs are provided and a number of the tabs is kept constant. The number of tabs may be fixed or may be equal to a value of the maxOccurs attribute in the XML Schema.

Furthermore, when the number of the tabs 801 is increased, the conditions input by the end user may be directly copied to the condition input fields on the tab 801 currently displayed to generate a new tab 801 including the condition input fields having the copied conditions as initial values. With this method, it is possible to save the trouble of inputting the query conditions on the multiple tabs 801 when the end user wants to set query conditions, many of which are common to the multiple tabs 801 and only part of which is different between the tabs 801.

The end user can input the conditions for the separate repetitions with the multiple tabs 801 and can specify the join operator between the conditions to make queries with various conditions being specified.

Referring back to FIG. 2, after the query window that is set up in the manner described above is displayed operation S205 in the display apparatus 204, then in operation S206, the end user inputs the query conditions in the query window. In operation S207, the automatic query window generation unit 201 generates query code described in the query language (Xquery) on the basis of the schema information and the query conditions input by the end user. In operation S208, the automatic query window generation unit 201 transmits the query code to the query processing unit 202 where the query code is executed.

In operation S209, the automatic query window generation unit 201 displays a response to the query code, returned from the query processing unit 202, in the query window. Then, the process of automatically generating a query window is terminated.

In the manner described above, the end user can make or formulate a query with respect to all the tagged document data (XML data 203) stored in the database in the query processing unit 202 without requiring the generation of a query window by a specialist on system building. In addition, the end user can specify the condition(s) for an arbitrary item in the tagged document.

Figure 10A:
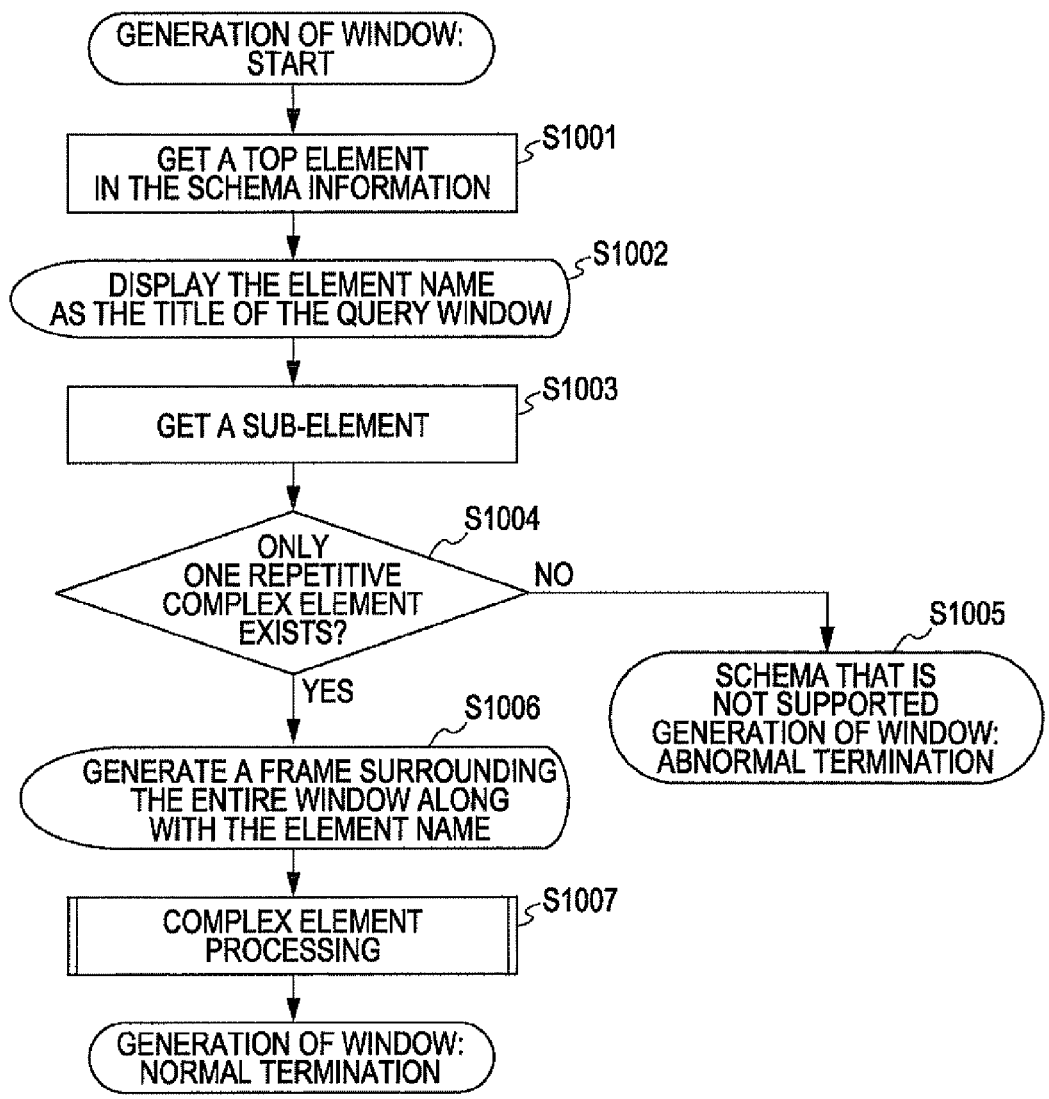
FIGS. 10A and 10B are flowcharts illustrating operation(s) for automatically generating a query window.
Figure 10B:
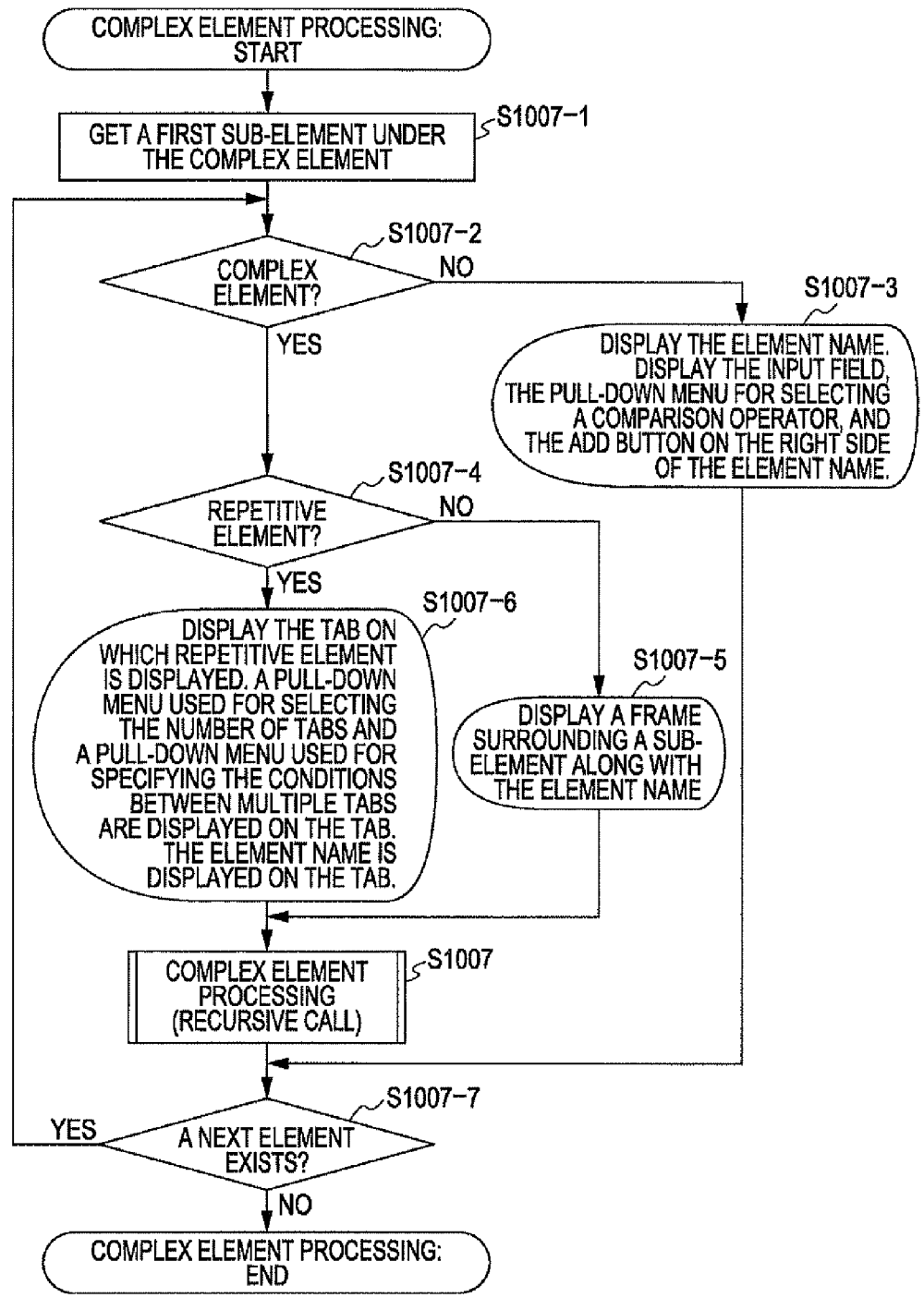

FIGS. 10A and 10B are flowcharts showing in detail operation(s) for automatically generating a query window in operation S204 in FIG. 2, performed by the automatic query window generation unit 201.

Referring to FIG. 10A, in operation S1001, the automatic query window generation unit 201 gets a top element 404 (FIG. 4) in the schema information.

In operation S1002, the automatic query window generation unit 201 displays element name "Order list" of the top element 404 as a title of the query window ("Order list" query window 506 in FIG. 5).

In operation S1003, the automatic query window generation unit 201 gets a sub-element (the repetitive complex element 401-1 in FIG. 4) under the top element 404.

In operation S1004, the automatic query window generation unit 201 determines whether only one repetitive complex element exists. If the determination in operation S1004 is affirmative, then in operation S1006, the automatic query window generation unit 201 generates the frame 505-1 in FIG. 5 surrounding the entire window, along with the element name "Order" 504-1 in FIG. 5. If the determination in operation S1004 is negative, in operation S1005, the automatic query window generation unit 201 performs error processing. The special processing, different from the processing for other sub-elements, is performed for this second-level sub-element. This is because it is assumed that the elements meeting the conditions are to be extracted from the XML data in which the many second-level elements are repeated in the query window in embodiment(s) of the present invention and the joining of the multiple conditions for the "Order" element with the "AND" operator has no logical meaning, unlike the third-level or lower repetitive complex elements. Multiple conditions may be specify for the "Order" element with the tab 801 (FIG. 8), like the third-level or lower repetitive complex elements, and only the joining of the multiple conditions with the "OR" operator may be allowed.

In operation S1007, the automatic query window generation unit 201 performs complex element processing for sub-elements under the second-level complex elements. The complex element processing will now be described in detail with reference to FIG. 10B.

Referring to FIG. 10B, in operation S1007-1, the automatic query window generation unit 201 gets a first sub-element under a complex element (second-level). The automatic query window generation unit 201 performs a loop process from operation S1007-2 to operation S1007-7 while acquiring a lower-level element to be processed under the second-level complex element.

Specifically, in operation S1007-2, the automatic query window generation unit 201 determines whether the element to be processed is a complex element.

If the determination in operation S1007-2 is negative and the element to be processed is an simple element (the simple element 403-1 or 403-2 in FIG. 4), then in operation S1007-3, the automatic query window generation unit 201 displays the element name 501, the input fields 502 and 503, pull-down menu for selecting comparison operator where the end user inputs the value and the conditional expression, and the "Add" button 701, as described above with reference to FIGS. 5 to 7. In operation S1007-7, the automatic query window generation unit 201 determines whether a next element exists. If the next element exists, the process goes back from operation S1007-7 to operation S1007-2 and the automatic query window generation unit 201 processes the subsequent element.

If the determination in operation S1007-2 is affirmative and the element to be processed is a complex element, then in operation S1007-4, the automatic query window generation unit 201 determines whether the element to be processed is a repetitive (complex) element.

If the determination in operation S1007-4 is negative and the element to be processed is a non-repetitive (complex) element (the non-repetitive complex element 402-1 in FIG. 4), then in operation S1007-5, the automatic query window generation unit 201 displays the element name 504-2 and the frame 505-2 surrounding the display of sub-elements under the element name 504-2, as described above with reference to FIG. 8.

If the determination in operation S1007-4 is affirmative and the element to be processed is a repetitive complex element (the repetitive complex element 401-2 in FIG. 4), then in operation S1007-6, the automatic query window generation unit 201 displays the element name 504-3 and the frame 505-3 surrounding the display of sub-elements under the element name 504-3 in the tab format and also displays the pull-down menus 802 and 803 allowing the end user to specify the conditions with the multiple tabs 801, as described above with reference to FIGS. 8 and 9.

In operation S1007, the automatic query window generation unit 201 recursively calls the complex element processing to process the sub-elements under the complex element to be processed. In operation S1007-7, the automatic query window generation unit 201 determines whether a next element exists. If the next element exists, the process goes back from operation S1007-7 to operation S1007-2 and the automatic query window generation unit 201 processes the subsequent element.

After all the sub-elements under the second-level complex elements are processed (the loop process from operation S1007-2 to operation S1007-7) in the manner described above, the step for automatically generating a query window is terminated.

FIGS. 11 to 14 are flowcharts showing in detail operation(s) for generating Xquery code in operation S207 in FIG. 2, performed by the automatic query window generation unit 201. The flowcharts in FIGS. 11 to 14 are sequentially described.

Figure 11B:
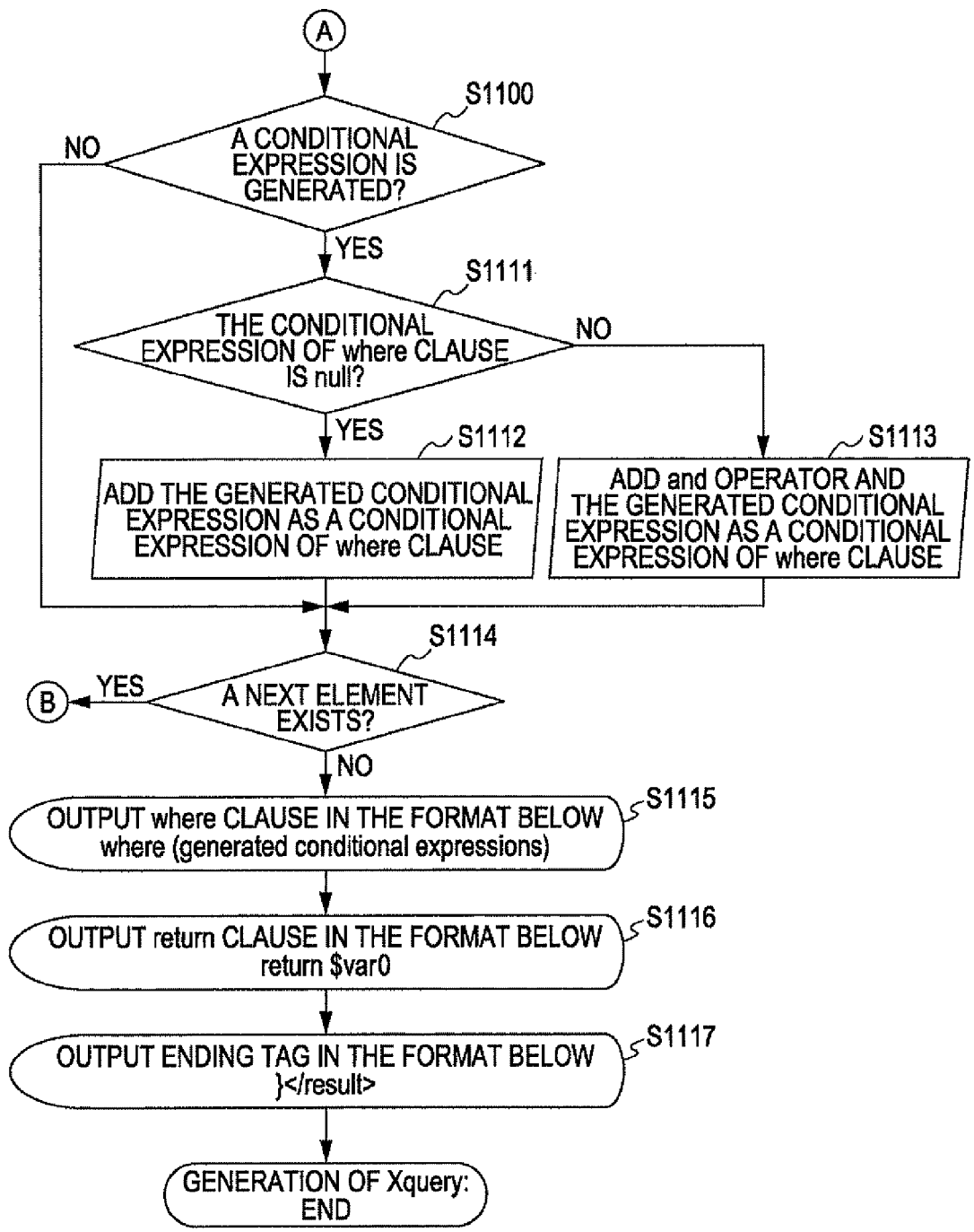

Referring to FIGS. 11A and 11B, in operation S1101, the automatic query window generation unit 201 generates a beginning tag. In operations S1102 and S1103, the automatic query window generation unit 201 generates a "for" clause according to the XQuery description rule. In operations S1104 and S1105, the automatic query window generation unit 201 performs initialization.

Then, the automatic query window generation unit 201 specifies the conditions corresponding to each element on the query window on the basis of the schema information (FIG. 4) in a loop process from operation S1106 to operation S1114. Specifically, in operation S1106, the automatic query window generation unit 201 gets a next-level sub-element (first-level element for the first time). In operation S1107, the automatic query window generation unit 201 determines whether the element to be processed is a complex element. If the element to be processed is not a complex element, then in operation S1108, the automatic query window generation unit 201 performs simple element processing. If the element to be processed is a complex element, then in operation S109, the automatic query window generation unit 201 performs complex element processing. In operation S100, the automatic query window generation unit 201 determines whether the conditional expression is generated. If the conditional expression is generated, then in operation S111 and operation S1112 (for a first condition) or operation S1113 (for a second or a subsequent condition), the automatic query window generation unit 201 generates a "where" clause according to the XQuery description rule while joining the conditional expressions generated for the elements with the "AND" operator. If the conditional expression is not generated in operation S100, the process goes to S1114.

In Operation S1114, the automatic query window generation unit 201 determines whether a next element exists. After the processing of all the elements is completed, in Operation S115, the automatic query window generation unit 201 outputs the "where" clause. In Operation S1116, the automatic query window generation unit 201 outputs a "return" clause. In Operation S1117, the automatic query window generation unit 201 outputs an ending tag. Then, the process for generating XQuery code is terminated.

Figure 12:
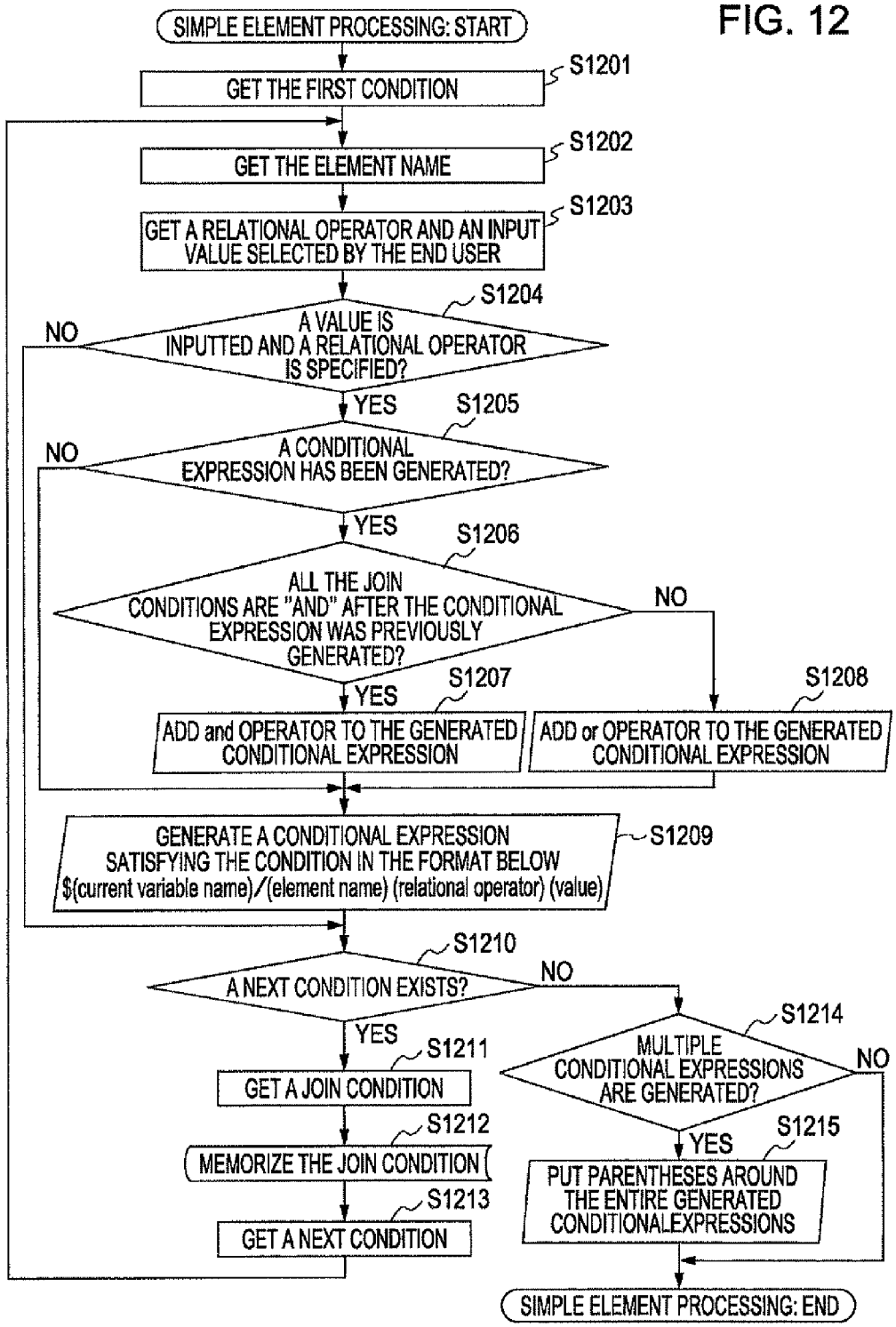
FIG. 12 is a flowchart showing an example of operation(s) for generating XQuery code.

FIG. 12 is a flowchart showing in detail the simple element processing (S1108 in FIG. 11A).

Referring to FIG. 12, the automatic query window generation unit 201 performs a loop process (from Operation S1202 to Operation S1213) for generating the conditional expressions corresponding to the input conditions while acquiring values (first condition S1201 and element name S1202) of the input fields 502 and 503 (refer to FIG. 5) from the form data in the query window in Operations S1201 and S1213. Specifically, in Operation S1203, the automatic query window generation unit 201 acquires the value of the input field 502 specified by the end user and a relational operator in the input field 503 from the form data in the query window. In Operation S1209, the automatic query window generation unit 201 generates a conditional expression according to the XQuery description rule on the basis of the acquired value and relational operator. In the case of the second or subsequent conditional expression, in Operation S1205, Operation S1206, Operation S1207 or S1208, the automatic query window generation unit 201 joins the conditional expressions that have been generated with the "AND" operator or the "OR" operator acquired in Operation S1211 (the pull-down menu 702 in FIG. 7). As shown in FIG. 12, the join condition may be stored at operation S1212.

In Operation S1210, the automatic query window generation unit 201 determines whether a next element exists. After the processing of all the input conditions in one simple element is completed, then in Operation S1214, the automatic query window generation unit 201 determines whether the multiple conditional expressions are generated. If the multiple conditional expressions are generated, then in Operation S1215, the automatic query window generation unit 201 surrounds the entire conditional expressions with a parenthesis ( ). Then, the generation of the conditional expression for one simple element is terminated.

Figure 13A:
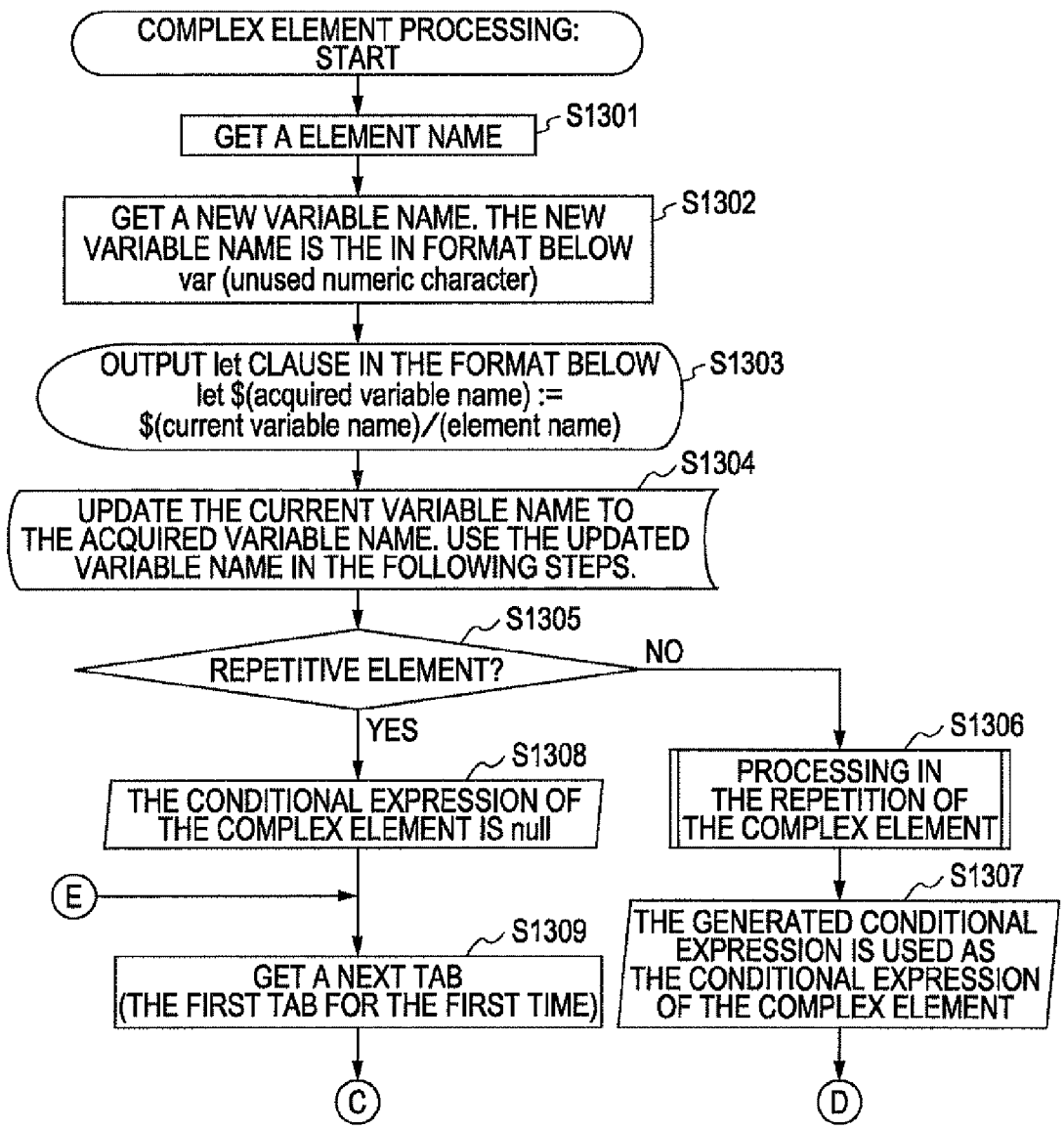
FIGS. 13A and 13B are flowcharts illustrating an example of operation(s) for generating XQuery code.
Figure 13B:
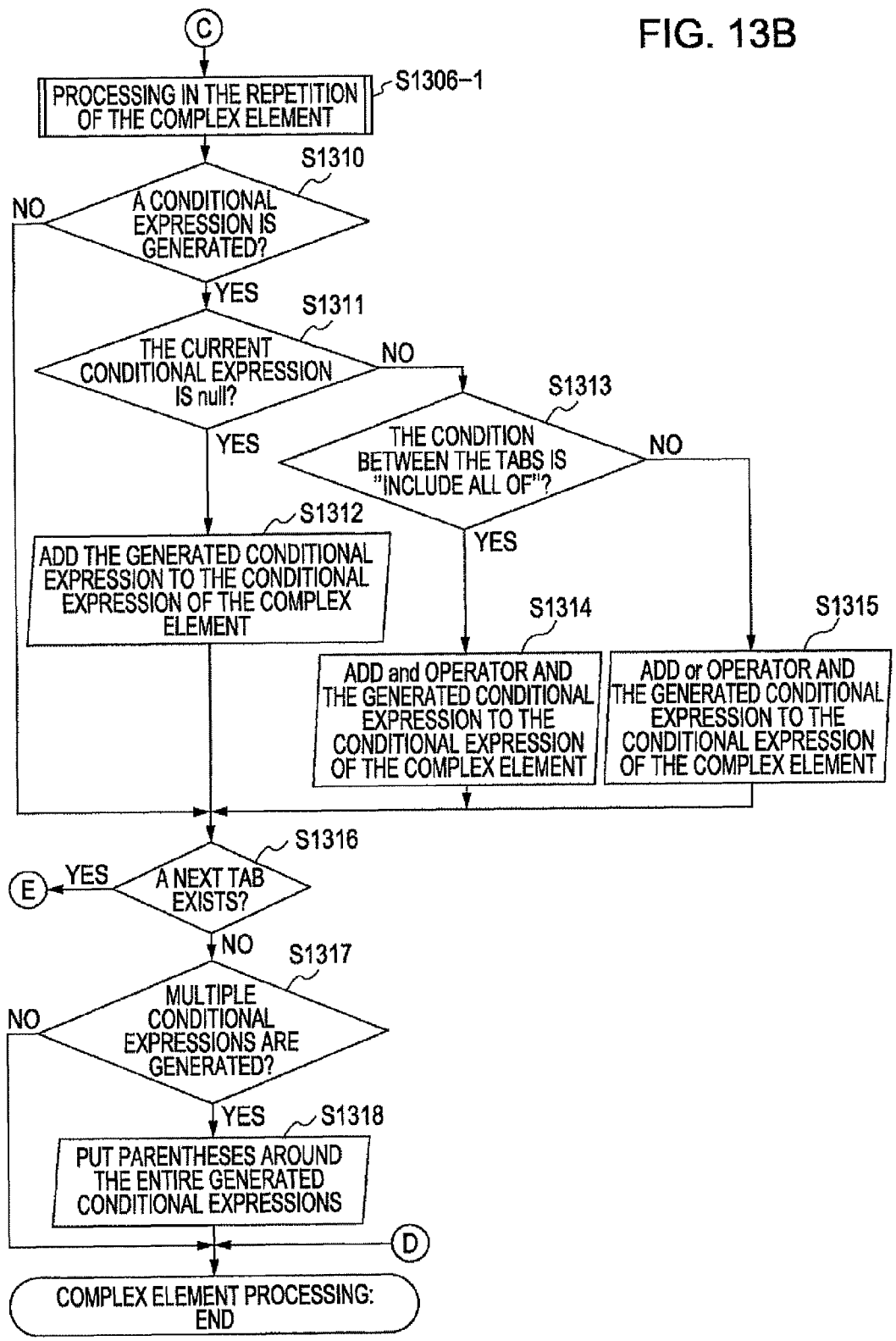
Figure 14:
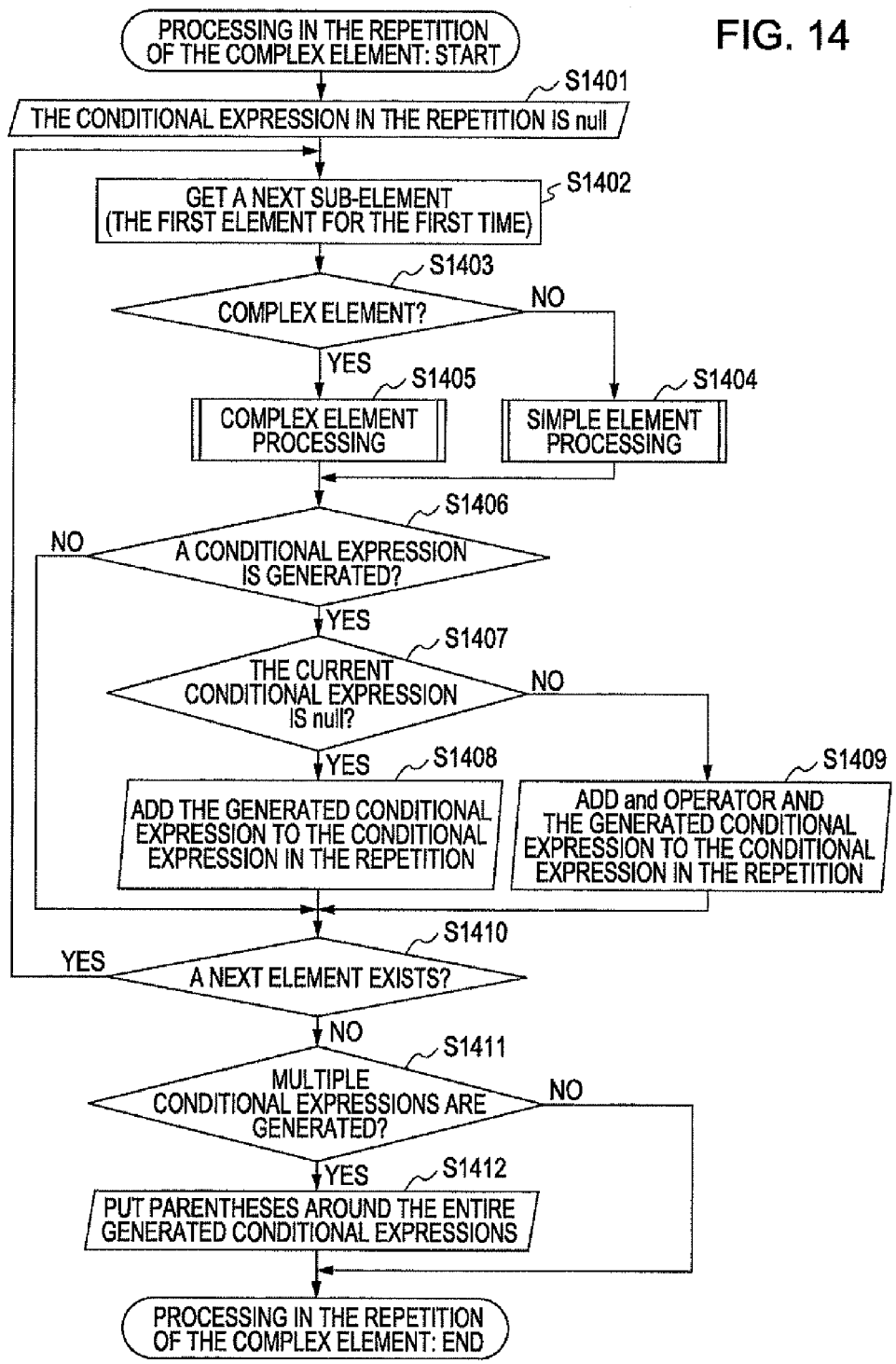
FIG. 14 is a flowchart illustrating an example of operation(s) for generating XQuery code.

FIGS. 13A and 13B and FIG. 14 are flowcharts showing in detail the complex element processing (Operation S1109 in FIG. 11A).

Referring to FIGS. 13A and 13B, in Operation S1301, the automatic query window generation unit 201 gets the name of the complex element. In Operations S1302, S1303, and S1304, the automatic query window generation unit 201 processes a variable name used for identifying the conditional expression corresponding to the element.

In Operation S1305, the automatic query window generation unit 201 determines whether the complex element is a repetitive complex element. If the complex element is not a repetitive complex element (the determination in Operation S1305 is negative), then in Operation S1306, the automatic query window generation unit 201 performs "processing in the repetition of the complex element", described below, for generating the conditional expression for the complex element. In Operation S1307, the automatic query window generation unit 201 determines the generated conditional expression to be the conditional expression for the complex element. Then, the complex element processing in Operation S109 in FIG. 11A is terminated.

If the complex element is a repetitive complex element (the determination in Operation S1305 is affirmative), in Operation S1308, the automatic query window generation unit 201 initializes the conditional expression for the complex element. Then, the automatic query window generation unit 201 generates the conditional expression corresponding to each tab while acquiring the condition specified for each tab (the tab 801 in FIG. 9) on the query window from the form data in the query window in a loop process from Operation S1309 to Operation S1316 and joins the tabs with each other.

Specifically, in Operation S1309, the automatic query window generation unit 201 acquires the tab to be processed. In Operation S1306-1, the automatic query window generation unit 201 performs "the processing in the repetition of the complex element" described below for generating the conditional expression for the tab element.

In Operation S1310, the automatic query window generation unit 201 determines whether the conditional expression is generated. If the conditional expression is generated and the automatic query window generation unit 201 determines in Operation S1311 that the generated conditional expression is the first conditional expression for the complex element, then in Operation S1312, the automatic query window generation unit 201 determines the generated conditional expression to be the conditional expression for the complex element.

If the automatic query window generation unit 201 determines in Operation S1310 that the conditional expression is generated and the automatic query window generation unit 201 determines in Operation S1311 that the conditional expression generated in Operation S1306 is the second or subsequent conditional expression for the complex element (the determination in Operation S1311 is negative), then in Operations S1313 and S1314 or S1315, the automatic query window generation unit 201 joins the generated conditional expression to the conditional expressions that have been generated for the complex element with the "AND" operator or the "OR" operator specified as the join operator between the conditions specified on each tab. The specification of the join operator can be acquired as the form data on the pull-down menus 802 and 803 on the query window shown in FIG. 8.

In Operation S1316, the automatic query window generation unit 201 determines whether a next tab exists. After the processing of all the tab elements is completed, then in Operation S1317, the automatic query window generation unit 201 determines whether the multiple conditional expressions are generated. If the multiple conditional expressions are generated, then in Operation S1318, the automatic query window generation unit 201 surrounds the entire conditional expressions with a parenthesis ( ). Then, the generation of the conditional expression for the complex element to be processed is terminated. On the other hand, in Operation S1317, when determining that there are no multiple conditional expression are generated, the process ends.

FIG. 14 is a flowchart showing in detail the "processing in the repetition of the complex element" in Operation S1306 in FIGS. 13A and 13B for generating the conditional expressions for the elements in one repetition.

Referring to FIG. 14, in Operation S1401, the automatic query window generation unit 201 initializes the conditional expression set in the repetition. Then, the automatic query window generation unit 201 generates the conditional expression corresponding to each sub-element under the complex element to be processed while acquiring the conditions specified for the sub-element under the complex element to be processed from the form data in the query window in a loop process from Operation S1402 to Operation S1410 and joins the generated conditional expressions with each other.

Specifically, in Operation S1402, the automatic query window generation unit 201 gets the next sub-element. In Operation S1403, the automatic query window generation unit 201 determines whether the sub-element is a complex element. If the sub-element is not a complex element, then in Operation S1404, the automatic query window generation unit 201 recursively calls the simple element processing shown in the flowchart in FIG. 12 to perform the simple element processing in order to generate the conditional expression corresponding to the sub-element. If the sub-element is a complex element, then in Operation S1405, the automatic query window generation unit 201 recursively calls the complex element processing shown in the flowcharts in FIGS. 13A and 13B to perform the complex element processing in order to generate the conditional expression corresponding to the sub-element.

In Operation S1406, the automatic query window generation unit 201 determines whether the conditional expression is generated. If the conditional expression is generated, then in Operation S1407 and Operation S1408 (for a first condition) or Operation S1409 (for a second or a subsequent condition), the automatic query window generation unit 201 generates the conditional expression corresponding to each sub-element while joining the conditional expressions generated for the elements with the "AND" operator. If the conditional expression is not generated in Operation S1406, the process goes to S1410.

In Operation S1410, the automatic query window generation unit 201 determines whether a next element exists. After the processing of all the sub-elements is completed, then in Operation S1411, the automatic query window generation unit 201 determines whether the multiple conditional expressions are generated. If the multiple conditional expressions are generated, then in Operation S1412, the automatic query window generation unit 201 surrounds the entire conditional expressions with a parenthesis ( ). Then, the generation of the conditional expressions for the elements in the repetition is terminated. When determining that multiple conditional expressions are not generated in Operation S1411, processing ends.

FIG. 15 shows an example of XQuery code generated in the operation for generating Xquery code, shown in the flowcharts in FIGS. 11A to 14.

Figure 16:
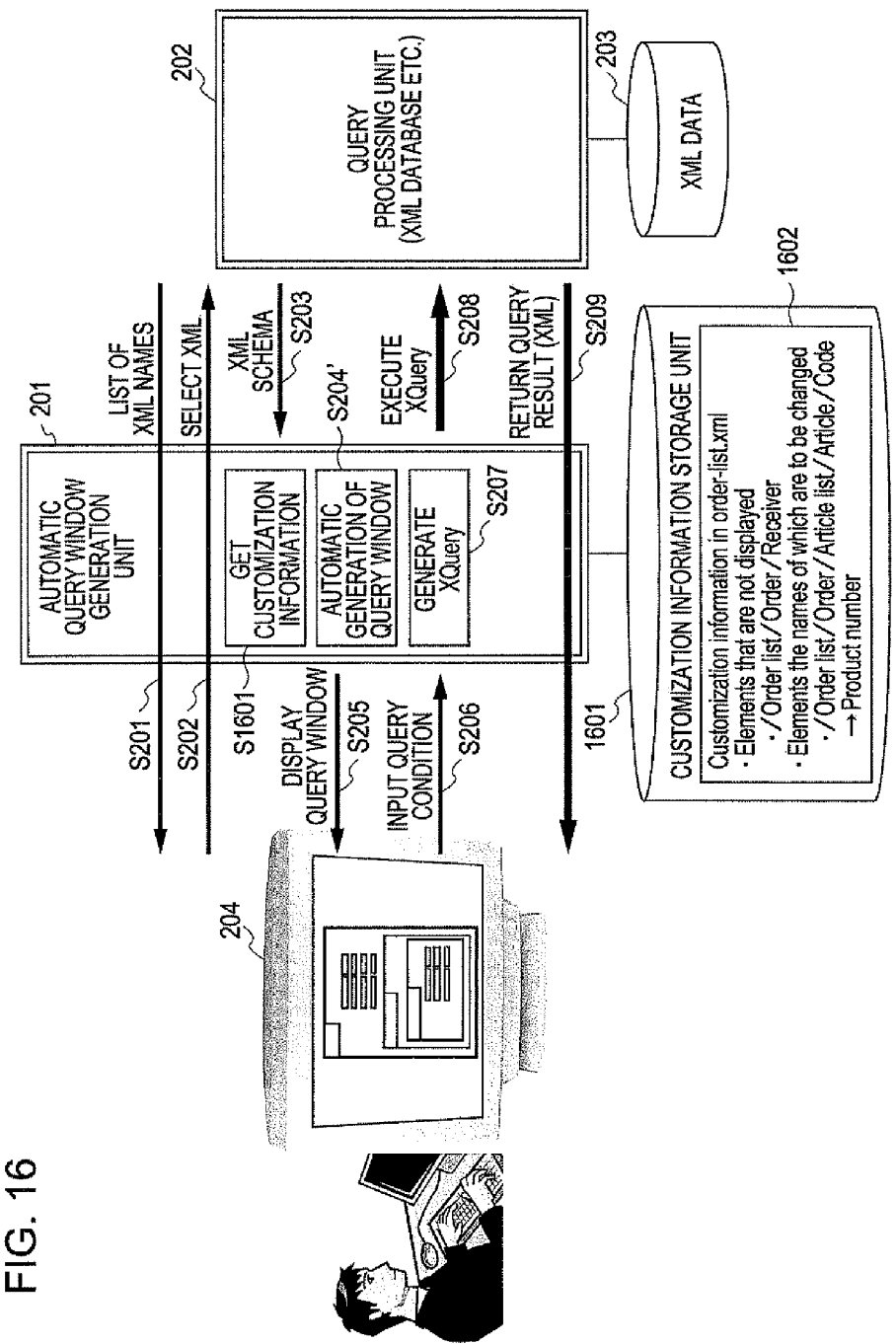
FIG. 16 illustrates a configuration and a query process.

FIG. 16 illustrates a configuration and a query process according to an embodiment of the present invention.

The technique of completely automatically generating a query window from the schema information in the XML data 203 is described in the above embodiment of the present invention.

However, the technique according to an embodiment of the present invention sometimes becomes unavailable, for example, in the following cases.

The end user does not want to display the "Receiver" in the query window because it is meaningless.

The end user wants to display "Product number", instead of the "Code", in the query window.

In such cases, it is preferred to enable customization of the query window that is to be automatically generated.

In the query process shown in FIG. 16 according to an embodiment of the present invention, the automatic query window generation unit 201 includes a customization information storage unit 1601 storing customization information 1602, in addition to the configuration shown in FIG. 2 according to the above discussed embodiment of the present invention.

The customization information 1602 stored in the customization information storage unit 1601 is generated in advance by, for example, a system administrator. For example, the customization information 1602 includes:

Specification of an element that is not to be displayed: the element that is not to be displayed is specified by its path from the root.

Specification of an element whose display name is to be changed: the element whose display name is to be changed is specified by its path from a root and the display name subjected to the change is also displayed.

"Acquisition of customization information" in Operation S1601 is added to the operations shown in FIG. 2 according to the above embodiment of the present invention, performed by the automatic query window generation unit 201.

Specifically, after acquiring the schema information concerning the tagged document data selected by the end user from the query processing unit 202 in Operation S203, then in Operation S1601, the automatic query window generation unit 201 accesses the customization information storage unit 1601 to acquire the customization information 1602. If an instruction about an element is included in the customization information 1602 when the query window is to be generated on the basis of each element in the schema information, then in Operation S204', the automatic query window generation unit 201 varies the content of the query window to be generated in accordance with the instruction about the element. Operation(s) similar to those described with FIG. 2 are not repeated with description of FIG. 16.

Figure 17:
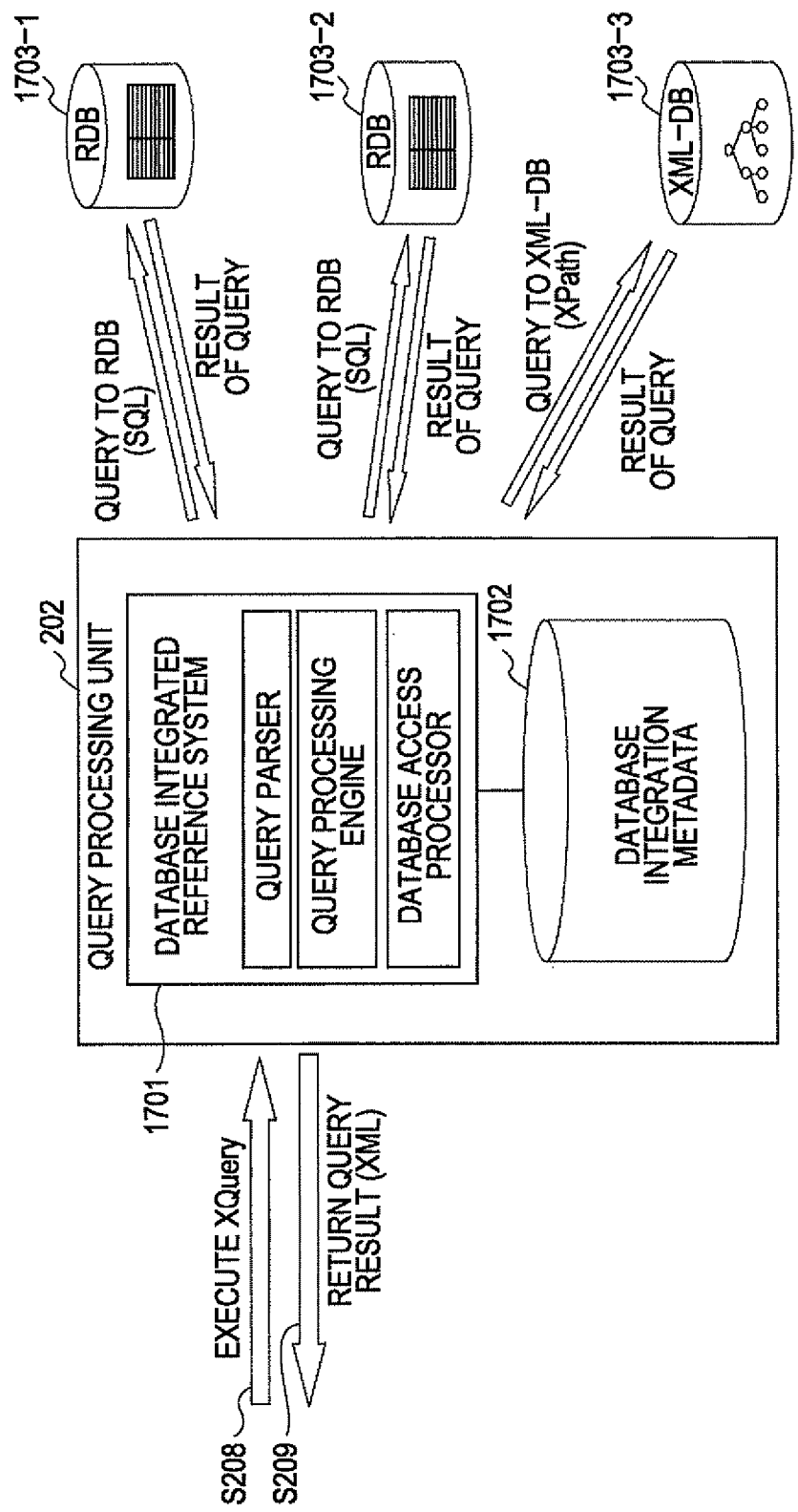
FIG. 17 illustrates an example of a configuration of a database integrated reference system.

FIG. 17 illustrates a configuration according to an embodiment of the present invention.

The configuration according to an embodiment of the present invention embodies the query processing unit 202 shown in FIG. 1 and shown in FIG. 16.

In the configuration according to an embodiment of the present invention, the query processing unit 202 includes a database integrated reference system 1701 and database integration metadata 1702.

The assignee has filed the invention of virtual integration of the pieces of data distributed in multiple relational databases (RDBs) including RDBs 1703-1 and the 1703-2 and an XML database (XML-DB) 1703-3 to provide a view in an XML format.

The XQuery is used as the query interface (Operation S208 in FIG. 2 or 16) and the query result is returned in the XML (Operation S209 in FIG. 2 or 16). Accordingly, the database integrated reference system 1701 does not differ from systems (such as, XML databases) storing the XML data as the entities in the sight of only the query interface. The database integrated reference system 1701 differs from the systems storing the XML data as the entities in that the XML Schema defining the schema of the XML data does not exist in the database integrated reference system 1701 because the database integrated reference system 1701 holds no XML data as the entities. The database integrated reference system 1701 defines in advance the database integration metadata 1702 used for generating the view in the XML format from multiple data sources, instead of the XML Schema. The database integrated reference system 1701 can realize the automatic query window generation according to embodiment(s) of the present invention by using the database integration metadata 1702 instead of the XML Schema.

FIGS. 18 to 21 show an example of the database integration metadata 1702. The database integration metadata 1702 includes the following pieces of information.

Virtual XML schema information: information indicating how related data across the multiple databases 1703-1, 1703-2, and 1703-3 is presented to the end user as the XML data (part of the database integration metadata 1702 shown in FIG. 18).

Correspondence between database items: information indicating which item in which database corresponds to each node in the XML (part of the database integration metadata 1702 shown in FIGS. 19 and 20).

Information about association between elements: information indicating which item in each database is used when the pieces of the XML data and tuples in the different databases 1703-1, 1703-2, and 1703-3 are associated with each other to generate one XML code (part of the database integration metadata 1702 shown in FIG. 21).

The structure of the view in the virtual XML format presented by the database integrated reference system 1701 in FIG. 17 is defined by the virtual XML schema information in FIG. 18. In the virtual XML schema information, a format similar to the XML Schema is used to define the XML structure of the integrated data view. Nodes building the schema is categorized into the following three types.

ComplexElement

Intermediate node including sub-nodes. When the corresponding database is the RDB, the set of the ComplexElement node and SimpleElement nodes under the ComplexElement node correspond to one tuple. When the corresponding database is the XML-DB, the ComplexElement node is an intermediate node having sub-nodes but has no value. Any of the nodes of the three types occur under the ComplexElement node.

SimpleElement

End node including a value. When the corresponding database is the RDB, the SimpleElement node corresponds to one column in each tuple and holds only the value of the column. When the corresponding database is the XML-DB, the SimpleElement node corresponds to an end node including a value. No node occurs under the SimpleElement node because it is the end node.

TagElement

Dummy node into which a tag is inserted. The TagElement node has no corresponding database element. Any of the nodes of the three types occurs under the TagElement node.

Specific identifiers (IDs) are assigned to the ComplexElement and SimpleElement nodes in order to establish the correspondence with the database items corresponding to the respective nodes. The IDs are called ComplexElement-ID and SimpleElement-ID, respectively.

The ComplexElement and SimpleElement nodes each have a "visible" attribute. If the value of the "visible" attribute is set to "false", the ComplexElement or SimpleElement node is used only in the process of joining the pieces of data and has no relation to the schema of the view. In other words, the ComplexElement and SimpleElement nodes are ignored in the description of the XQuery code and do not occur in the XML. Accordingly, the elements having the "visible" attribute set to "false" can be ignored.

The virtual XML schema information (FIG. 18) in the database integration metadata 1702 defines a tree structure (hierarchical structure) of the XML, like the XML Schema. The elements of the above three types can be processed in the following manner to perform the automatic query window generation (the flowchart shown in FIG. 10) in the same process as in the XML Schema.

The SimpleElement is processed as an simple element.

The TagElement is processed as a non-repetitive complex element.

The ComplexElement is processed as a repetitive complex element if the value of the "maxOccurs" attribute is equal to two or more and is processed as a non-repetitive complex element if the value of the "maxOccurs" attribute is equal to one.

The top node in the XML is not defined in the database integration metadata 1702. The first ComplexElement node defined in the virtual XML schema information (FIG. 18) corresponds to the second top node in the virtual XML. Accordingly, it may be necessary to replace the name of the top element used in Operations S1001 and S1002 in FIG. 10 with the XML file name.

No information about the data type is defined in the database integration metadata 1702. However, information indicating which piece of data in the real database each element in the virtual XML corresponds to is described as an ID in the correspondence with the database items (FIGS. 19 and 20). The database integrated reference system 1701 holds information indicating which part in which database in which server each ID indicates. The information about the data type in the real database is also held in the database integrated reference system 1701. Accordingly, the information about a data type in a real database can be acquired and be used as the data type of each element in the virtual XML.

As described above, since it was typically necessary for an end user having no technical knowledge to request a specialist, such as a system developer, to generate the query window and wait for completion of a query window in order to make a new query, it takes time and cost. In contrast, according to the disclosed invention, the query window for the end user is automatically generated, so that it does not require cost and it is not necessary for the end user to wait for the development of the query window. Consequently, it is possible to easily introduce new queries.

The configuration according to the last embodiment of the present invention described herein is combined with the technology for easily providing a virtual view of data distributed across multiple databases in a tagged document format, disclosed in, for example, Japanese Unexamined Patent Application Publication No. 2005-208757, 2006-18607, or 2007-257083 by the assignee, to allow the end user to easily make a query about the data distributed across the multiple databases.

It should be understood by those skilled in the art that various modifications, combinations, sub-combinations and alterations may occur depending on design requirements and other factors insofar as they are within the scope of the appended claims or the equivalents thereof.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-readable recording medium recording a program causing a computer that accesses a query processing apparatus to automatically generate a query window for an end user, the program causing execution of operations comprising:

acquiring virtual schema information related to tagged document data from the query processing apparatus;

automatically generating a query window based on the virtual schema information acquired;

specifying an increase or a decrease in a number of repetitions of condition input fields for a repetitive item on the query window that is automatically generated;

copying content of the condition input fields in a certain repetition to the condition input fields in a repetition to be newly added when an increase in the number of repetitions is specified;

specifying a joining condition between conditions corresponding to the condition input fields in each of the repetitions, an increase or a decrease in the number of which is specified; and generating query code from information input in the query window and transmitting the query code to the query processing apparatus, and wherein the query processing apparatus includes an interface that virtually integrates and processes data distributed and stored in multiple databases in response to a query in a query language related to data in a tagged document format to return the tagged document data and provides the virtual schema information describing a relationship between the tagged document data and the multiple databases.

2. The computer-readable recording medium according to claim 1, wherein the automatically generating the query window includes switching choices for an operator in the condition input field corresponding to each item having a value on the query window, depending on a data type of the item.

3. The computer-readable recording medium recording the program according to claim 1, comprising:

specifying an increase or a decrease in a number of the condition input fields corresponding to items each having a value on the query window that is automatically generated; and specifying a joining condition between conditions corresponding to the condition input fields, an increase or a decrease in the number of which is specified.

4. The computer-readable recording medium recording the program according to any of claim 1, comprising:

holding customization information used for customizing content displayed in the query window; and varying the content displayed in the query window based on the customization information.

5. An apparatus accessing a query processing apparatus to automatically generate a query window for an end user, the apparatus comprising:

a virtual schema information acquiring unit that acquires virtual schema information related to tagged document data from the query processing apparatus;

an automatic query window generation unit that automatically generates a query window based on the virtual schema information acquired;

an increase-or-decrease-of-repetition specifying unit that specifies an increase or a decrease in a number of repetitions of condition input fields for a repetitive item on the query window that is automatically generated by the automatic query window generation unit;

a condition-input-field-in-repetition copying unit that copies content of the condition input fields in a certain repetition to the condition input fields in a repetition to be newly added when the increase-or-decrease-of-repetition specifying unit specifies an increase in the number of repetitions;

a joining-operator-in-repetition specifying unit that specifies a joining condition between conditions corresponding to the condition input fields in each of the repetitions, an increase or a decrease in the number of which is specified by the increase-or-decrease-of-repetition specifying unit; and a query code generating unit that generates query code from information input in the query window and transmits the query code to the query processing apparatus, and wherein the query processing apparatus includes an interface that virtually integrates and processes data distributed and stored in multiple databases in response to a query in a query language related to data in a tagged document format to return the tagged document data and provides the virtual schema information describing a relationship between the tagged document data and the multiple databases.

6. A method for automatically generating a query window for an end user by accessing a query processing apparatus, the method comprising:

acquiring virtual schema information related to tagged document data from the query processing apparatus;

automatically generating a query window based on the virtual schema information acquired;

specifying an increase or a decrease in a number of repetitions of condition input fields for a repetitive item on the query window that is automatically generated;

copying content of the condition input fields in a certain repetition to the condition input fields in a repetition to be newly added when an increase in the number of repetitions is specified;

specifying a joining condition between conditions corresponding to the condition input fields in each of the repetitions, an increase or a decrease in the number of which is specified; and generating query code from information input in the query window and transmitting the query code to the query processing apparatus, and wherein the query processing apparatus includes an interface that virtually integrates and processes data distributed and stored in multiple databases in response to a query in a query language related to data in a tagged document format to return the tagged document data and provides the virtual schema information describing a relationship between the tagged document data and the multiple databases.

* * * * *